US012544385B2

(12) United States Patent
Javed

(10) Patent No.: US 12,544,385 B2
(45) Date of Patent: Feb. 10, 2026

(54) COMBINATION DRUG THERAPIES FOR CNS DISORDERS

(71) Applicant: Mohammad Javed, Dumfries, VA (US)

(72) Inventor: Mohammad Javed, Dumfries, VA (US)

( * ) Notice: Subject to any disclaimer, the term of this patent is extended or adjusted under 35 U.S.C. 154(b) by 779 days.

(21) Appl. No.: 17/796,160

(22) PCT Filed: Jan. 25, 2021

(86) PCT No.: PCT/US2021/014860
§ 371 (c)(1),
(2) Date: Jul. 28, 2022

(87) PCT Pub. No.: WO2021/154631
PCT Pub. Date: Aug. 5, 2021

(65) Prior Publication Data

US 2023/0105795 A1 Apr. 6, 2023

Related U.S. Application Data

(60) Provisional application No. 62/967,742, filed on Jan. 30, 2020.

(51) Int. Cl.
*A61K 31/5517* (2006.01)
*A61K 31/137* (2006.01)
*A61K 45/06* (2006.01)
*A61P 15/12* (2006.01)

(52) U.S. Cl.
CPC ........ *A61K 31/5517* (2013.01); *A61K 31/137* (2013.01); *A61K 45/06* (2013.01); *A61P 15/12* (2018.01)

(58) Field of Classification Search
CPC .. A61K 31/5517; A61K 31/137; A61K 45/06; A61P 15/12; A61P 25/22; A61P 25/24
See application file for complete search history.

(56) References Cited

U.S. PATENT DOCUMENTS

| | | | | |
|---|---|---|---|---|
| 2005/0096311 A1 | 5/2005 | Suffin et al. | | |
| 2011/0065628 A1 | 3/2011 | Johnson et al. | | |
| 2017/0165253 A1* | 6/2017 | Goren | ................ | A61K 31/4174 |

FOREIGN PATENT DOCUMENTS

| | | | | |
|---|---|---|---|---|
| WO | 2007039123 A2 | 4/2007 | | |
| WO | 2007042239 A1 | 4/2007 | | |
| WO | WO-2009138393 A1 * | 11/2009 | ............. | A61P 37/02 |
| WO | 2011146726 A1 | 11/2011 | | |

OTHER PUBLICATIONS

Siegel et al., Epilepsy & Behavior 49 (2015) 347-350. (Year: 2015).*

Stella et al., Prodrugs: Challenges and Rewards, Part 1, 2007. (Year: 2007).*

Clyton at al., Mayo Clin Proc, Apr. 2018;93(4):467-487 (Year: 2007).*

Camil Castelo-Branco, María J Cancelo & Peter Chedraui (2007) Femalesexual dysfunction in postmenopausal women, Expert Opinion on Therapeutic Patents, 17:6, 639-647. (Year: 2007).*

Stahl SM. Targeting circuits of sexual desire as a treatment strategy for hypoactive sexual desire disorder. J Clin Psychiatry. Jul. 2010;71(7):821-2. (Year: 2010).*

Pary R, Scarff JR, Jijakli A, Tobias C, Lippmann S. A Review of Psychostimulants for Adults With Depression. Fed Pract. Apr. 2015;32(Suppl 3):30S-37S. (Year: 2015).*

Singh T, Rajput MI. Alprazolam as a monotherapy for anxiety and depression. Psychiatry (Edgmont). Nov. 2005;2(11):32. (Year: 2005).*

Krisna Patel et al., Ther Adv Psychopharmacol 2016, vol. 6(2) 99-144. (Year: 2016).*

Alyssa J. Bolduan, David M. Haas (2015) A Systematic Review of the use of Bupropion for Hypoactive Sexual Desire Disorder in Premenopausal Women. Journal Of Woman's Reproductive Health—1(1):14-23. (Year: 2015).*

Sónia Simões, Progress in Neuro-Psychopharmacology & Biological Psychiatry 34 (2010) 236-237. (Year: 2010).*

Anette Skårner & Bengt Svensson, Nordic Studies on Alcohol and Drugs vol. 30. 2013, 5, pp. 403-423. (Year: 2013).*

(Continued)

*Primary Examiner* — Clinton A Brooks
*Assistant Examiner* — Izabela Schmidt
(74) *Attorney, Agent, or Firm* — Greenberg Traurig, LLP; Jonathan D. Ball

(57) ABSTRACT

The present disclosure provides at least one anxiolytic; and at least one stimulant; and a composition comprising: at least one anxiolytic; at least one stimulant; and a pharmaceutically acceptable carrier. Methods of treating a subject having a condition, such as a central nervous system disorder, comprising administering to the subject having a condition, at least one anxiolytic; and at least one stimulant, where the administering of the active ingredients, i.e., at least one anxiolytic and at least one stimulant, may occur together, separately, sequentially, and/or simultaneously. These active ingredients may be provided to a subject suffering from a condition in an amount sufficient to treat the condition in the subject in need thereof, where the treatment prevents, alleviates, reduces, eliminates, or interferes with at least one of the symptoms associated with the condition.

18 Claims, No Drawings

(56) References Cited

OTHER PUBLICATIONS

Griffin CE 3rd, Kaye AM, Bueno FR, Kaye AD. Benzodiazepine pharmacology and central nervous system-mediated effects. Ochsner J. 2013 Summer;13(2):214-23. (Year: 2013).*

Alshaimaa A. Elgarf, David C. B. Siebert, Friederike Steudle, Angelika Draxler, Guanguan Li, Shengming Huang, James M. Cook, Margot Ernst, and Petra Scholze ACS Chemical Biology 2018 13 (8), 2033-2039. (Year: 2018).*

Sitte HH, Freissmuth M. Amphetamines, new psychoactive drugs and the monoamine transporter cycle. Trends Pharmacol Sci. Jan. 2015;36(1):41-50. (Year: 2015).*

Castelo-Branco et al: "Female sexual dysfunction in postmenopausal women", Expert Opinion on Therapeutic Patents, vol. 17, No. 6, Jun. 1, 2007, pp. 639-647.

Clayton et al: "Efficacy of bremelanotide in the Reconnect Studies", European Neuropsychopharmacology, vol. 27, No. 4, Oct. 4, 2017, pp. S661-S662.

Extended European Search Report, issued by the European Patent Office, regarding corresponding patent application Serial No. EP 21748259.5; dated Feb. 26, 2024; 9 pages.

Segraves, Robert Taylor et al: "Bupropion Sustained Release for the Treatment of Hypoactive Sexual Desire Disorder in Premenopausal Women", Journal of Clinical Psychopharmacology, vol. 24, No. 3, Jun. 1, 2004, pp. 339-342.

International Preliminary Report on Patentability from corresponding International Patent Application No. PCT/US2021/014860, mailed Jul. 28, 2022, 13 pp.

International Search Report and Written Opinion from corresponding International Patent Application No. PCT/US2021/014860, mailed Jun. 4, 2021.

* cited by examiner

COMBINATION DRUG THERAPIES FOR CNS DISORDERS

CROSS-REFERENCE TO RELATED APPLICATIONS

This application is the U.S. National Stage Application, pursuant to 35 U.S.C. § 371 of PCT International Application No. PCT/US2021/014860, filed Jan. 25, 2021 designating the United States and published in English, which claims the benefit of and priority to U.S. Provisional Application No. 62/967,742, filed Jan. 30, 2020, which are hereby incorporated by reference in their entirety for all purposes.

FIELD OF DISCLOSURE

The present disclosure relates to novel combination drug therapies for treating symptoms of a condition in a subject, such as, central nervous system disorders.

BACKGROUND

Central nervous system (CNS) disorders or conditions, which relate to the brain and spinal cord, include a wide array of conditions where the brain does not function as it should. The CNS disorders or conditions may be due to a structural or genetic defect, an abnormality in neural communication or connectivity, biochemical imbalances, overstimulation of the brain's pleasure or reward center, and the like.

Hypoactive sexual desire disorder (HSDD) is considered to be a persistent or recurrent deficiency or lack of sexual fantasies and desire for sexual activity with marked distress or interpersonal difficulty that is not accounted for by a general medical or psychiatric condition (see, e.g., DSM-IV). Although HSDD affects both men and women, this disorder has been found to be more prevalent in women affecting millions. The mechanism of action in treating HSDD is not fully understood. However, it has been found that some HSDD drugs may include those that act by enhancing dopaminergic and noradrenergic activity (excitatory) and reducing serotonergic (inhibitory) activity in the prefrontal cortex; and those that activate neurons expressing specific receptors found in the CNS. For example, flibanserin contains a mix of a 5-$HT_{1A}$ receptor agonist and a 5-$HT_{2A}$ receptor antagonist, and may induce activation of the inhibitory 5-$HT_{1A}$ receptor and inhibition of the excitatory 5-$HT_{2A}$ receptor, thereby resulting in decreased serotonin release and increased dopamine and norepinephrine concentrated in the prefrontal cortex which is thought to be associated with sexual interest and desire. Another example includes bremelanotide, which is a melanocortin receptor (MCR) that has been shown to activate receptors, and specifically binding to MC4R, which is expressed by neurons present in areas of the central nervous system. HSDD was initially thought not to be due to a co-existing medical or psychiatric condition, problems in a relationship, or the effects of a medication or other drug substance. However, there have been studies showing that there may be an association between post-traumatic stress disorder (PTSD) and HSDD.

PTSD is a disorder that develops after a person has experienced or witnessed a traumatic or terrifying event in which serious physical harm occurred or was threatened. Diagnosis occurs if an individual has at least one re-experiencing symptom, at least one avoidance symptom, at least two arousal and reactivity symptoms, and at least two cognition and mood symptoms (see, e.g., DSM-IV or DSM-5). Re-experiencing symptoms include flashbacks, nightmares, or frightening thoughts. Avoidance symptoms include avoiding places, events, or objects that are reminders of the traumatic experience, and avoiding thoughts or feelings related to the traumatic event. Arousal and reactivity symptoms include being easily surprised, feeling tense or anxious, having difficulty sleeping, and being angry or aggressive. Cognition and mood symptoms may include difficulty remembering key details of the traumatic event, negativity about oneself or globally, having distorted feelings such as guilt or blame, and losing interest in previously enjoyable activities. Typical medications prescribed to those suffering from PTSD include those affecting the neurotransmitters serotonin or norepinephrine, such as SSRIs and SNRIs. Other PTSD medications include anti-adrenergic agents, anticonvulsants, antidepressants, anti-psychotics, and miscellaneous antiemetics.

CNS disorders have typically been treated by administering a drug sequentially as in monotherapy, where these mono-therapeutic drugs that may be partially effective, are used in combination by trial and error method, until a fully effective combination is determined to treat the CNS disorder, generally displayed as a reduction of the CNS symptoms. The most commonly used drugs for CNS disorders associated with, for example, depression, include selective serotonin reuptake inhibitors (SSRI), selective norepinephrine reuptake inhibitors (SNRI), and the like. It has been suggested that these drugs increase or regulate the synaptic level of neurotransmitters, particularly, norepinephrine, serotonin, and dopamine. Although there has been some success in using monotherapy for treating depression, some patients are non-responsive or have symptoms that worsen over time.

Therefore, there is a need to provide a safe, effective, and novel combination of active ingredients, a composition containing the combination of active ingredients, and methods of use for the treatment of a condition in a subject, where the condition includes CNS disorders, such as but not limited to, a sexual disorder, HSDD, an anxiety disorder, PTSD, ADHD, depression, a sleep disorder, hypersomnia, narcolepsy, a weight management disorder, obesity, being overweight, increased appetite, bulimia, a memory loss disorder, dementia, Alzheimer's disease, and the symptoms of a traumatic brain injury, and the like, and the effective amount of the combination of active ingredients is sufficient to reduce one or more symptoms of any of the conditions.

SUMMARY

One aspect of the disclosure provides for a method of treating a female subject suffering from hypoactive sexual desire disorder (HSDD) condition, comprising: administering an effective amount of benzodiazepine and an effective amount of amphetamine, where the benzodiazepine is alprazolam, or a pharmaceutically acceptable salt, enantiomer, mixture of enantiomers, or racemic mixture of the benzodiazepine, and/or a prodrug of any of the foregoing; the amphetamine is dextroamphetamine, dextroamphetamine sulfate, a combination of: amphetamine aspartate monohydrate, amphetamine sulfate, dextroamphetamine sulfate, and dextroamphetamine saccharate, or a pharmaceutically acceptable salt, enantiomer, mixture of enantiomers, or racemic mixture of the amphetamine, and/or a prodrug of any of the foregoing. Another aspect may be directed to the method of treating a female subject suffering from HSDD, where the benzodiazepine and the amphetamine are administered together, separately, simultaneously, or sequentially. Other aspects provide the method, where the benzodiazepine and the amphetamine are administered in a unit dosage form comprising 0.25 mg-0.5 mg benzodiazepine and 10 mg-20 mg amphetamine, where the unit dosage form is: a single composition or separate compositions, and the unit dosage form is an oral composition selected from: a pill, a tablet, a caplet, a capsule, a lozenge, a syrup, or a suspension. In some aspects, the oral composition is formulated as: an immediate-release dosage, a controlled-release, a modified-release dosage, a sustained-release dosage, a delayed-release dosage, an extended-release dosage, a long-acting release dosage, a prolonged-release dosage, or a timed-release dosage.

Yet another aspect of the method of treating a female subject suffering from HSDD, comprising administering an effective amount of benzodiazepine of: 0.1 mg or greater, 10 mg or less, or 0.25 mg to 0.5 mg; and an effective amount of amphetamine of: 1 mg or greater, 60 mg or less, or 10 mg to 20 mg. One aspect provides for the method, where the benzodiazepine is alprazolam in an effective amount of 0.25 mg-0.5 mg; and the effective amount of amphetamine is 10 mg to 20 mg, where the amphetamine is: dextroamphetamine sulfate or a combination of: amphetamine aspartate monohydrate, amphetamine sulfate, dextroamphetamine sulfate, and dextroamphetamine saccharate. In other aspects, the effective amount of amphetamine is expressed as total amphetamine base equivalence, where the total amphetamine base equivalence is 3 mg to 20 mg.

Another aspect may relate to the method of treating a female subject suffering from HSDD according to DSM-IV comprising administering an effective amount of benzodiazepine and an effective amount of amphetamine, where the effective amount is an effective amount for a single administration and/or daily administration and/or twice a day administration and/or multiple administrations per day or as needed (for example, in the event of an anxiety or panic event). In yet another aspect, the method of treating a female subject suffering from HSDD fails to respond to treatment with an antidepressant, such as but not limited to, a selective serotonin reuptake inhibitor (SSRI), a selective norepinephrine reuptake inhibitor (SNRI), a tricyclic antidepressant (TCA), a monoamine oxidase inhibitor (MAOI), or combinations thereof. One aspect provides for the method of treating a female subject suffering from HSDD comprising administering an effective amount of benzodiazepine and an effective amount of amphetamine, and further administering an antidepressant, such as but not limited to, a selective serotonin reuptake inhibitor (SSRI), a selective norepinephrine reuptake inhibitor (SNRI), a tricyclic antidepressant (TCA), a monoamine oxidase inhibitor (MAOI), or combinations thereof.

Some aspects may be directed to the method of treating a female subject suffering from HSDD, where the female subject does not suffer from: attention deficient hyperactivity disorder (ADHD) according to Diagnostic and Statistical Manual of Mental Disorders (DSM)-5, an anxiety disorder according to DSM-IV or DSM-5, a diagnosis of anxiety according to DSM-IV or DSM-5, a diagnosis of a panic disorder according to DSM-IV or DSM-5, hypersomnia according to DSM-IV or DSM-5, or narcolepsy according to DSM-5, or combinations of the foregoing.

Other aspect provide for the method of treating a female subject suffering from HSDD, where the female subject suffers from: a stress disorder including but not limited to: a trauma and stress-related disorder according to DSM-5, a post-traumatic stress disorder (PTSD) according to DSM-5, ADHD, an anxiety disorder according to DSM-IV or DSM-5, a panic disorder according to DSM-IV or DSM-5, a depressive disorder according to DSM-5 (including e.g., significant weight gain or weight loss, increase or decrease in appetite), mood disorders (DSM-IV or DSM-5), sleep or sleep-wake disorders according to DSM-IV or DSM-5, hypersomnia, narcolepsy, a traumatic brain injury (TBI) according to DSM-5, dementia according to DSM-5, including but not limited to, neurocognitive disorder (NCD), dementia with Lewy Bodies, Frontotemporal dementia, dementia caused by: Alzheimer's disease, Parkinson's disease, Huntington's disease, prion disease, a TBI, an eating disorder according to DSM-5 (e.g., bulimia, binge-eating disorder, obesity), or the like, or combinations of any of the foregoing.

Further aspects relate to the method of treating a female subject suffering from HSDD, by administering an effective amount of benzodiazepine and an effective amount of amphetamine, where the method of treating reduces the symptoms of: HSDD, PTSD, ADHD, anxiety, a depressive disorder, a TBI, dementia, hypersomnia, narcolepsy, obesity, bulimia, or any combinations of any of the foregoing.

In yet other aspects, a method of treating a condition in a subject, the method comprising: administering to a subject in need thereof, an effective amount of benzodiazepine; and an effective amount of amphetamine, wherein the condition is selected from: depression or a depressive disorder (including symptoms e.g., significant weight gain or weight loss, increase or decrease in appetite), a stress disorder, an anxiety disorder, a panic disorder, a trauma- and stressor-related disorder according to DSM-5, a post-traumatic stress disorder (PTSD), a hypoactive sexual desire disorder (HSDD), a sleep or sleep-wake disorder, hypersomnia, narcolepsy, an anxiety disorder, an attention disorder, attention deficit hyperactivity disorder (ADHD), traumatic brain injury (TBI), an eating disorder or binge eating disorder according to DSM-5, obesity or bulimia (having symptoms including but not limited to increased appetite), being overweight, a memory loss disorder, dementia, Alzheimer's disease dementia, Parkinson's disease dementia, Lewy Body dementia, frontotemporal dementia, Creutzfeldt-Jakob dementia, and the like, or combinations of any of the foregoing may be provided.

One aspect may be directed to a method comprising diagnosing a female subject as having HSDD according to DSM-IV; administering an effective amount of benzodiazepine and an effective amount of amphetamine to the subject diagnosed as having HSDD, thereby treating the subject diagnosed as having HSDD, where treatment reduces at least one symptom of HSDD.

Yet a further aspect provides a method of diagnosing a condition in a subject, where the subject is diagnosed as suffering from a central nervous system (CNS) disorder according to DSM-IV; and administering to the subject in need thereof, an effective amount of benzodiazepine and an effective amount of amphetamine, thereby treating the condition diagnosed in the subject, where treatment reduces at least one symptom of the CNS disorder.

Another aspect of the disclosure provides for a method of treating a condition in a subject, the method comprising administering to the subject in need thereof, the composition or active ingredients (at least one anxiolytic and at least one stimulant) described herein, where the condition is selected from a depression or depressive disorder (including symptoms e.g., significant weight gain or weight loss, increase or decrease in appetite), a stress disorder, an anxiety, a trauma- and stressor-related disorder, a post-traumatic stress disorder (PTSD), a hypoactive sexual desire disorder (HSDD), hypersomnia, attention deficit hyperactivity disorder (ADHD), attention deficit disorder (ADD), a sleep or sleep-wake disorder, hypersomnia, narcolepsy, an eating disorder, a binge eating disorder, bulimia, obesity, being overweight, a memory loss disorder, dementia, Alzheimer's disease dementia, Parkinson's disease dementia, Lewy Body dementia, frontotemporal dementia, Creutzfeldt-Jakob dementia, and the like, or combinations of any of the foregoing, wherein the composition is or active ingredients are in an amount effective to treat the condition. The effective amount of the active ingredients or composition comprising the active ingredients may be administered to the subject in need thereof in a single administration, a daily administration, a twice a day administration, and/or on an as needed basis (e.g., when the subject suffers from an anxiety or panic attack). In other aspects where the active ingredients are benzodiazepine and amphetamine, the effective amount of benzodiazepine is 0.1 mg or greater or 10 mg or less (e.g., 0.1 mg-10 mg, 0.25 mg, 0.5 mg, 1 mg); and the effective amount of amphetamine is 1 mg or greater or 60 mg or less (e.g., 1 mg-60 mg, 10 mg, 20 mg). Some aspects may provide active ingredients comprising a benzodiazepine and an amphetamine, where the benzodiazepine comprises an effective amount of alprazolam that may be administered in a unit dosage form comprising 0.1 mg-10 mg alprazolam (e.g., 0.25 mg-0.5 mg); and the amphetamine comprises an effective amount of dextroamphetamine sulfate that may be administered in a unit dosage form comprising 1 mg-60 mg (e.g., 10 mg-20 mg) or comprises an effective amount of a combination of: amphetamine aspartate monohydrate, amphetamine sulfate, dextroamphetamine sulfate, and dextroamphetamine saccharate, wherein the amphetamine may be administered in a unit dosage form comprising 1 mg to 60 mg amphetamine (e.g., 10 mg-20 mg), where the total amphetamine base equivalence of the combination of amphetamines may be 3 mg-20 mg. The effective amount of active ingredients or a composition comprising the active ingredients may be formulated for a single administration and/or daily administration and/or twice a day administration and/or as needed in case of an event (e.g., an anxiety or panic attack). One aspect may be directed to a depression disorder selected from major depressive disorder, minor depression disorder, dysthymia, postpartum depression, seasonal affective disorder, bipolar disorder, mixed anxiety depression, unspecified depression, adjustment disorder, atypical depression, psychotic depression, suicidal ideation, and combinations thereof. A further aspect provides for methods of treating a condition that is hyposexual desire disorder (HSDD), where the treatment increases interest in sexual activity or fantasies in the treated subject, or reduces symptoms of HSDD. Another aspect may be directed to methods of treating a condition that is a post-traumatic stress disorder (PT SD), where the treatment reduces anxiety in the subject, or reduces the symptoms of PTSD.

Yet another aspect may provide methods of treating a condition by administering a composition comprising at least one anxiolytic; at least one stimulant; and a pharmaceutically acceptable carrier, and further administering an antidepressant, such as but not limited to, a selective serotonin reuptake inhibitor (SSRI), a selective norepinephrine reuptake inhibitor (SNRI), or the like, amitriptyline, amoxapine, clomipramine, desipramine, doxepin, imipramine, nortriptyline, protriptyline, trimipramine; mirtazapine, bupropion, trazodone, vortioxetine, vilazodone; and the like, or a combination of any of the foregoing antidepressants. In one aspect, the SSRI is selected from sertraline, paroxetine, fluoxetine, fluvoxamine, escitalopram, citalopram, vilazodone, or a combination of any of the foregoing. Another aspect may be directed to an SNRI selected from desvenlafaxine, duloxetine, venlafaxine, milnacipran, levomilnacipran, or the like, or a combination of any of the foregoing. In one aspect, the method of treating a condition in a subject comprising administering to the subject in need thereof, an effective amount of benzodiazepine and an effective amount of amphetamine, where the condition is selected from one or more of: a depression or a depressive disorder, an anxiety disorder, a panic disorder, a post-traumatic stress disorder (PTSD), an attention deficit hyperactivity disorder (ADHD), a sexual disorder, a hypoactive sexual desire disorder (HSDD), a sleeping disorder, hypersomnia, narcolepsy, traumatic brain injury (TBI), a an eating disorder, obesity, bulimia, a memory loss disorder, dementia, and the like, where the subject fails to respond to treatment with an antidepressant, such as but not limited to, SSRI, SRNI, or combination thereof or the antidepressant administered does not reduce symptoms in the subject suffering from the condition.

A further aspect provides for methods of treating a condition in a subject by administering to the subject in need thereof, a composition comprising an effective amount of a benzodiazepine and an amphetamine, and a pharmaceutically acceptable carrier, where the condition is selected from a depression disorder, a post-traumatic stress disorder (PTSD), a hypoactive sexual desire disorder (HSDD), hypersomnia, narcolepsy, attention deficit hyperactivity disorder (ADHD), attention deficit disorder (ADD), traumatic brain injury (TBI), eating disorder, bulimia, obesity, being overweight, dementia, or combinations of any of the foregoing conditions, and where the composition is in an amount effective to treat the condition and for a single administration and/or daily administration and/or twice a day and/or as needed in case of an event (e.g., an anxiety or panic attack). In one aspect, the benzodiazepine is selected from alprazolam, lorazepam, chlordiazepoxide, diazepam, or a combination thereof, or a pharmaceutically acceptable salt, enantiomer, mixture of enantiomers, or racemic mixture of the benzodiazepine, and/or a prodrug of any of the foregoing. Another aspect may be directed to the amphetamine selected from levoamphetamine, dextroamphetamine, dextroamphetamine saccharate, amphetamine aspartate monohydrate, dextroamphetamine sulfate, amphetamine sulfate, or a combination thereof, or a pharmaceutically acceptable salt, enantiomer, mixture of enantiomers, or racemic mixture of the amphetamine, and/or a prodrug of any of the foregoing.

Another aspect provides for methods of treating a condition in a subject by administering to the subject in need thereof a composition comprising: alprazolam or a pharmaceutically acceptable salt, enantiomer, mixture of enantiomers, or racemic mixture of alprazolam, and/or a prodrug of any of the foregoing; dextroamphetamine or a pharmaceutically acceptable salt, enantiomer, mixture of enantiomers, or racemic mixture of dextroamphetamine, and/or a prodrug of any of the foregoing, and a pharmaceutically acceptable carrier. In yet another aspect, the method described herein further comprises administering an antidepressant, such as but not limited to, a selective serotonin reuptake inhibitor (SSRI), a selective norepinephrine reuptake inhibitor (SNRI), where the SSRI is selected from sertraline, paroxetine, fluoxetine, fluvoxamine, escitalopram, citalopram, vilazodone; the SNRI is selected from desvenlafaxine, duloxetine, venlafaxine, milnacipran, levomilnacipran; amitriptyline, amoxapine, clomipramine, desipramine, doxepin, imipramine, nortriptyline, protriptyline, trimipramine; mirtazapine, bupropion, trazodone, vortioxetine, vilazodone; and the like, or a combination of any of the foregoing antidepressants. A further aspect may provide for the method further comprising administering the antidepressant (e.g., SSRI, SNRI), or a combination thereof, before, simultaneously with, or after the administration of the composition or active ingredients described here.

In other aspects, the method of treating a condition in a subject by administering to a subject in need thereof, an effective amount of (a) benzodiazepine; and an effective amount of (b) amphetamine is provided. One aspect may be directed to benzodiazepine selected from: benzodiazepine, or a pharmaceutically acceptable salt, enantiomer, mixture of enantiomers, or racemic mixture of the benzodiazepine, and/or a prodrug of any of the foregoing; and where amphetamine is selected from: amphetamine, or a pharmaceutically acceptable salt, enantiomer, mixture of enantiomers, or racemic mixture of the amphetamine, and/or a prodrug of any of the foregoing, where benzodiazepine is alprazolam and amphetamine is dextroamphetamine. Another aspect provides for an effective amount of alprazolam of 0.25 mg-0.5 mg and an effective amount of dextroamphetamine of 10 mg-20 mg. A further aspect provides for a method of treating a condition in a subject by administering alprazolam and dextroamphetamine in an amount effective to treat the condition in a subject, where the condition is selected from a depression or depressive disorder, a post-traumatic stress disorder (PTSD), a hypoactive sexual desire disorder (HSDD), hypersomnia, narcolepsy, attention deficit hyperactivity disorder (ADHD), attention deficit disorder (ADD), traumatic brain injury (TBI), or eating disorder (e.g., bulimia, obesity, being overweight). In yet a further aspect, the method of treatment of a condition in a subject reduces the symptoms or severity of the condition in a subject.

Yet another aspect provides for a method comprising diagnosing a female subject or a premenopausal female subject as having HSDD according to DSM-IV; and administering an effective amount of benzodiazepine and an effective amount of amphetamine to the female subject diagnosed as having HSDD, thereby treating the female subject diagnosed as having HSDD, where treatment results in a reduction in the symptoms of HSDD (e.g., lack of libido) or an increase in the number of sexually satisfying events (SSEs) or a combination of both.

Furthermore, one aspect of the disclosure is directed to a method, comprising diagnosing a condition in a subject, where the subject is diagnosed as suffering from a central nervous system (CNS) disorder according to DSM-IV; and administering to the subject in need thereof, an effective amount of benzodiazepine and an effective amount of amphetamine.

DETAILED DESCRIPTION

Detailed embodiments of the present disclosure are disclosed herein; however, it is to be understood that the disclosed embodiments are merely illustrative of the disclosure that may be embodied in various forms. In addition, each of the examples given in connection with the various embodiments of the disclosure is intended to be illustrative, and not restrictive.

Definitions

All terms used herein are intended to have their ordinary meaning in the art unless otherwise provided. All concentrations are in terms of percentage by weight of the specified component relative to the entire weight of the topical composition, unless otherwise defined.

As used herein, "a" or "an" shall mean one or more. As used herein when used in conjunction with the word "comprising," the words "a" or "an" mean one or more than one. As used herein "another" means at least a second or more.

The term "administration" or "administering" includes routes of introducing the compound, or a composition thereof, of the disclosure as described herein, to a subject to perform their intended function. Non-limiting examples of routes of administration that may be used include: injection (subcutaneous, intravenous, parenterally, intraperitoneally, intrathecal), oral, inhalation, rectal, and transdermal. The pharmaceutical compositions may be given by forms suitable for each administration route. For example, these compositions may be administered in pill, tablet, caplet, or capsule (e.g., hard-shelled, soft-shelled, enteric coated, sustained-release, spansule) form, orally, or by catheter or injection (e.g., subcutaneous, intramuscular, intravenous, intraperitoneal, intracardiac, intraarticular, and intracavernous), inhalation, infusion, topical (e.g., lotion, ointment, dermal patch), and rectally by suppositories or rectal capsules. The composition of the present disclosure may also be administered using conventional techniques used in the form of absorption wafers through oral administration. The composition and methods described here may be for oral administration as provided in some embodiments of the disclosure.

As used herein, all ranges of numeric values include the endpoints and all possible values disclosed between the disclosed values. The exact values of all half integral numeric values are also contemplated as specifically disclosed and as limits for all subsets of the disclosed range. For example, a range of from 0.1% to 3% specifically discloses a percentage of 0.1%, 1%, 1.5%, 2.0%, 2.5%, and 3%. Additionally, a range of 0.1 to 3% includes subsets of the original range including from 0.5% to 2.5%, from 1% to 3%, from 0.1% to 2.5%, etc. It will be understood that the sum of all weight % of individual components will not exceed 100%.

Throughout this description, various components may be identified having specific values or parameters, however, these items are provided as exemplary embodiments. Indeed, the exemplary embodiments do not limit the various aspects and concepts of the present disclosure as many comparable parameters, sizes, ranges, and/or values may be implemented. Unless otherwise specified, the terms "first," "second," and the like, "primary," "secondary," and the like, do not denote any order, quantity, or importance, but rather are used to distinguish one element from another.

By "consist essentially" it is meant that the ingredients include only the listed components along with the normal impurities present in commercial materials and with any other additives present at levels which do not affect the operation of the disclosure, for instance at levels less than 5% by weight or less than 1% or even 0.5% by weight.

It is understood by one of ordinary skill in the chemistry art that substitution at a given atom is limited by valency. The use of a substituent (radical) prefix names such as alkyl without the modifier optionally substituted or substituted is understood to mean that the particular substituent is unsubstituted. However, the use of haloalkyl without the modifier optionally substituted or substituted is still understood to mean an alkyl group, in which at least one hydrogen atom is replaced by halo. Where a group may be substituted by one or more of a number of substituents, such substitutions are selected so as to comply with principles of chemical bonding with regard to valencies, etc., and to give compounds which are not inherently unstable. For example, any carbon atom will be bonded to two, three, or four other atoms, consistent with the four valence electrons of carbon. Additionally, when a structure has less than the required number of functional groups indicated, those carbon atoms without an indicated functional group are bonded to the requisite number of hydrogen atoms to satisfy the valency of that carbon.

The term "pharmaceutical composition," as used herein, represents a composition containing a compound described herein formulated with a pharmaceutically acceptable excipient. In some embodiments, the pharmaceutical composition is manufactured or sold with the approval of a governmental regulatory agency as part of a therapeutic regimen for the treatment of disease in a mammal. Pharmaceutical compositions can be formulated, for example, for oral administration in unit dosage form (e.g., a pill, tablet, an orally disintegrating tablet, orally dissolving tablet, sustained-release tablet, sugar-coated tablet, film-coated tablet, enteric-coated tablet, a caplet, a capsule (e.g., hard-shelled, soft-shelled, enteric coated, sustained-release, spansule), a lozenge, or a suspension); for topical administration (e.g., as a cream, gel, lotion, or ointment); for intravenous administration (e.g., as a sterile solution free of particulate emboli and in a solvent system suitable for intravenous use); or in any other formulation described herein.

As used herein, the phrase "pharmaceutically acceptable" generally safe for ingestion or contact with biologic tissues at the levels employed. Pharmaceutically acceptable is used interchangeably with physiologically compatible. It will be understood that the pharmaceutical compositions of the disclosure include nutraceutical compositions (e.g., dietary supplements) unless otherwise specified.

Unit dosage forms, also referred to as unitary dosage forms, often denote those forms of medication supplied in a manner that does not require further weighing or measuring to provide the dosage (e.g., pill, tablet, capsule, caplet, etc.). For example, a unit dosage form may refer to a physically discrete unit suitable as a unitary dosage for human subjects and other mammals, each unit containing a predetermined quantity of active material calculated to produce the desired therapeutic effect, in association with any suitable pharmaceutical excipient or excipients. Exemplary, non-limiting unit dosage forms include a tablet (e.g., a chewable tablet), caplet, capsule (e.g., hard-shelled, soft-shelled, enteric coated, sustained-release, spansule), lozenge, film, strip, and gel cap. In certain embodiments, the compounds described herein, including crystallized forms, polymorphs, and solvates thereof, may be present in a unit dosage form.

Useful pharmaceutical carriers, excipients, and diluents for the preparation of the compositions hereof, can be solids, liquids, or gases. These include any and all solvents, dispersion media, coatings, antibacterial and antifungal agents, isotonic and absorption delaying agents and the like. The pharmaceutically acceptable carrier or excipient does not destroy the pharmacological activity of the disclosed compound and is nontoxic when administered in doses sufficient to deliver a therapeutic amount of the compound. Thus, the compositions can take the form of tablets, pills, capsules, suppositories, powders, enterically coated or other protected formulations (e.g., binding on ion-exchange resins or packaging in lipid-protein vesicles), sustained release formulations, solutions, suspensions, elixirs, and aerosols. The carrier can be selected from the various oils including those of petroleum, animal, vegetable, or synthetic origin, e.g., peanut oil, soybean oil, mineral oil, and sesame oil. Water, saline, aqueous dextrose, and glycols are examples of liquid carriers, particularly (when isotonic with the blood) for injectable solutions. For example, formulations for intravenous administration comprise sterile aqueous solutions of the active ingredient(s) which are prepared by dissolving solid active ingredient(s) in water to produce an aqueous solution, and rendering the solution sterile. Suitable pharmaceutical excipients include starch, cellulose, chitosan, talc, glucose, lactose, gelatin, malt, rice, flour, chalk, silica, magnesium stearate, sodium stearate, glycerol monostearate, sodium chloride, dried skim milk, glycerol, propylene glycol, water, and ethanol. The compositions may be subjected to conventional pharmaceutical additives such as preservatives, stabilizing agents, wetting or emulsifying agents, salts for adjusting osmotic pressure, and buffers. Suitable pharmaceutical carriers and their formulation are described in Remington's Pharmaceutical Sciences by E. W. Martin. Such compositions will, in any event, contain an effective amount of the active ingredient(s) together with a suitable carrier, and any other ingredients, particularly inactive ingredients for the preparation of formulation or administration, so as to prepare the proper dosage form for administration to the subject or recipient.

Non-limiting examples of pharmaceutically acceptable carriers and excipients include sugars such as lactose, glucose and sucrose; starches such as corn starch and potato starch; cellulose and its derivatives such as sodium carboxymethyl cellulose, ethyl cellulose and cellulose acetate; powdered tragacanth; malt; gelatin; talc; cocoa butter and suppository waxes; oils such as peanut oil, cottonseed oil, safflower oil, sesame oil, olive oil, corn oil and soybean oil; glycols, such as polyethylene glycol and propylene glycol; esters such as ethyl oleate and ethyl laurate; agar; buffering agents such as magnesium hydroxide and aluminum hydroxide; alginic acid; isotonic saline; Ringer's solution; ethyl alcohol; phosphate buffer solutions; non-toxic compatible lubricants such as sodium lauryl sulfate and magnesium stearate; coloring agents; releasing agents; coating agents; sweetening, flavoring and perfuming agents; preservatives; antioxidants; ion exchangers; alumina; aluminum stearate; lecithin; self-emulsifying drug delivery systems (SEDDS) such as d-atocopherol polyethylene glycol 1000 succinate; surfactants used in pharmaceutical dosage forms such as Tweens or other similar polymeric delivery matrices; serum proteins such as human serum albumin; glycine; sorbic acid; potassium sorbate; partial glyceride mixtures of saturated vegetable fatty acids; water, salts or electrolytes such as protamine sulfate, disodium hydrogen phosphate, potassium hydrogen phosphate, sodium chloride, and zinc salts; colloidal silica; magnesium trisilicate; polyvinyl pyrrolidone; cellulose-based substances; polyacrylates; waxes; and polyethylene-polyoxypropylene-block polymers. Cyclodextrins such as α-, β-, and γ-cyclodextrin, or chemically modified derivatives such as hydroxyalkylcyclodextrins, including 2- and 3-hydroxypropyl-cyclodextrins, or other solubilized derivatives can also be used to enhance delivery of the compounds described herein.

The compounds described herein may be present as a pharmaceutically acceptable salt. Typically, salts are composed of a related number of cations and anions (at least one of which is formed from the compounds described herein) coupled together (e.g., the pairs may be bonded ionically, etc.) such that the salt is electrically neutral. Pharmaceutically acceptable salts may retain or have similar activity to the parent compound (e.g., an $ED_{50}$ within 10%, etc.) and have a toxicity profile within a range that affords utility in pharmaceutical compositions. For example, pharmaceutically acceptable salts may be suitable for use in contact with the tissues of humans and animals without undue toxicity, irritation, allergic response and are commensurate with a reasonable benefit/risk ratio. Pharmaceutically acceptable salts are described in: Berge et al., *J. Pharmaceutical Sciences* 66:1-19, 1977 and in *Pharmaceutical Salts: Properties, Selection, and Use*, (Eds. P. H. Stahl and C. G. Wermuth), Wiley-VCH, 2008. Salts may be prepared from pharmaceutically acceptable non-toxic acids and bases including inorganic and organic acids and bases. Representative acid addition salts include acetate, adipate, alginate, ascorbate, aspartate, benzenesulfonate, benzoate, bisulfate, borate, butyrate, camphorate, camphorsulfonate, citrate, cyclopentanepropionate, dichloroacetate, digluconate, dodecylsulfate, ethanesulfonate, formate, fumarate, glucoheptonate, glutamate, glycerophosphate, hemisulfate, heptonate, hexanoate, hippurate, hydrobromide, hydrochloride, hydroiodide, 2-hydroxy-ethanesulfonate, isethionate, lactobionate, lactate, laurate, lauryl sulfate, malate, maleate, malonate, mandelate, methanesulfonate, mucate, 2-naphthalenesulfonate, nicotinate, nitrate, oleate, oxalate, palmitate, pamoate, pantothenate, pectinate, persulfate, 3-phenylpropionate, phosphate, picrate, pivalate, propionate, stearate, succinate, sulfate, tartrate, thiocyanate, toluenesulfonate, undecanoate, and valerate salts. Representative basic salts include alkali or alkaline earth metal salts include sodium, lithium, potassium, calcium, and magnesium, aluminum salts, as well as nontoxic ammonium, quaternary ammonium, and amine cations, including, but not limited to ammonium, tetramethylammonium, tetraethylammonium, methylamine, dimethylamine, trimethylamine, triethylamine, caffeine, and ethylamine.

Pharmaceutically acceptable acid addition salts of the disclosure can be formed by the reaction of a compound of the disclosure with an equimolar or excess amount of acid. Alternatively, hemi-salts can be formed by the reaction of a compound of the disclosure with the desired acid in a 2:1 ratio, compound to acid. The reactants are generally combined in a mutual solvent such as diethyl ether, tetrahydrofuran, methanol, ethanol, isopropanol, benzene, or the like. The salts normally precipitate out of solution within, e.g., one hour to ten days and can be isolated by filtration or other conventional methods.

Compounds provided herein can have one or more asymmetric carbon atoms and can exist in the form of optically pure enantiomers, mixtures of enantiomers such as racemates, optically pure diastereoisomers, mixtures of diastereoisomers, diastereoisomeric racemates or mixtures of diastereoisomeric racemates. The optically active forms can be obtained for example by resolution of the racemates, by asymmetric synthesis or asymmetric chromatography (chromatography with a chiral adsorbent or eluent). That is, certain of the disclosed compounds may exist in various stereoisomeric forms. Stereoisomers are compounds that differ only in their spatial arrangement. Enantiomers are pairs of stereoisomers whose mirror images are not superimposable, most commonly because they contain an asymmetrically substituted carbon atom that acts as a chiral center. “Enantiomer” means one of a pair of molecules that are mirror images of each other and are not superimposable. Diastereomers are stereoisomers that are not related as mirror images, most commonly because they contain two or more asymmetrically substituted carbon atoms and represent the configuration of substituents around one or more chiral carbon atoms. Enantiomers of a compound can be prepared, for example, by separating an enantiomer from a racemate using one or more well-known techniques and methods, such as chiral chromatography and separation methods based thereon. The appropriate technique and/or method for separating an enantiomer of a compound described herein from a racemic mixture can be readily determined by those of skill in the art. “Racemate” or “racemic mixture” means a mixture containing two enantiomers, wherein such mixtures exhibit no optical activity; i.e., they do not rotate the plane of polarized light. “Geometric isomer” means isomers that differ in the orientation of substituent atoms (e.g., to a carbon-carbon double bond, to a cycloalkyl ring, to a bridged bicyclic system). Atoms (other than H) on each side of a carbon-carbon double bond may be in an E (substituents are on opposite sides of the carbon-carbon double bond) or Z (substituents are oriented on the same side) configuration. “R,” “S,” “S*,” “R*,” “E,” “Z,” “cis,” and “trans,” indicate configurations relative to the core molecule. Certain of the disclosed compounds may exist in atropisomeric forms. Atropisomers are stereoisomers resulting from hindered rotation about single bonds where the steric strain barrier to rotation is high enough to allow for the isolation of the conformers. The compounds disclosed herein may be prepared as individual isomers by either isomer-specific synthesis or resolved from an isomeric mixture. Conventional resolution techniques include forming the salt of a free base of each isomer of an isomeric pair using an optically active acid (followed by fractional crystallization and regeneration of the free base), forming the salt of the acid form of each isomer of an isomeric pair using an optically active amine (followed by fractional crystallization and regeneration of the free acid), forming an ester or amide of each of the isomers of an isomeric pair using an optically pure acid, amine or alcohol (followed by chromatographic separation and removal of the chiral auxiliary), or resolving an isomeric mixture of either a starting material or a final product using various well known chromatographic methods.

When the stereochemistry of a disclosed compound is named or depicted by structure, the named or depicted stereoisomer is at least 60%, 70%, 80%, 90%, 99%, or 99.9%) by weight relative to the other stereoisomers. When a single enantiomer is named or depicted by structure, the depicted or named enantiomer is at least 60%, 70%, 80%, 90%, 99%, or 99.9% by weight optically pure. When a single diastereomer is named or depicted by structure, the depicted or named diastereomer is at least 60%, 70%, 80%, 90%, 99%, or 99.9% by weight pure. Percent optical purity is the ratio of the weight of the enantiomer or over the weight of the enantiomer plus the weight of its optical isomer. Diastereomeric purity by weight is the ratio of the weight of one diastereomer or over the weight of all the diastereomers. When the stereochemistry of a disclosed compound is named or depicted by structure, the named or depicted stereoisomer is at least 60%, 70%, 80%, 90%, 99%, or 99.9% by mole fraction pure relative to the other stereoisomers. When a single enantiomer is named or depicted by structure, the depicted or named enantiomer is at least 60%, 70%, 80%, 90%, 99%, or 99.9% by mole fraction pure. When a single diastereomer is named or depicted by structure, the depicted or named diastereomer is at least 60%, 70%, 80%, 90%, 99%, or 99.9% by mole fraction pure. Percent purity by mole fraction is the ratio of the moles of the enantiomer or over the moles of the enantiomer plus the moles of its optical isomer. Similarly, percent purity by moles fraction is the ratio of the moles of the diastereomer or over the moles of the diastereomer plus the moles of its isomer. When a disclosed compound is named or depicted by structure without indicating the stereochemistry, and the compound has at least one chiral center, it is to be understood that the name or structure encompasses either stereoisomer of the compound free from the corresponding optical isomer, a racemic mixture of the compound or mixtures enriched in one enantiomer relative to its corresponding optical isomer. When a disclosed compound is named or depicted by structure without indicating the stereochemistry and has two or more chiral centers, it is to be understood that the name or structure encompasses a diastereomer free of other diastereomers, a number of diastereomers free from other diastereomeric pairs, mixtures of diastereomers, mixtures of diastereomeric pairs, mixtures of diastereomers in which one diastereomer is enriched relative to the other diastereomer(s) or mixtures of diastereomers in which one or more diastereomer is enriched relative to the other diastereomers. The disclosure embraces all of these forms.

Solvates of the compounds described herein may the aggregate of the compound or an ion of the compound with one or more solvents. Such solvents may not interfere with the biological activity of the solute. Examples of suitable solvents include, but are not limited to, water, methanol (MeOH), ethanol (EtOH), and acetic acid (AcOH). Solvates wherein water is the solvent molecule are typically referred to as hydrates. Hydrates include compositions containing stoichiometric amounts of water, as well as compositions containing variable amounts of water. Hydrates and solvates may be make up a crystalline solid molecular containing both a molecule, such as an active pharmaceutical ingredient or excipient, and another molecule such as water for hydrates or other solvents as solvates, where both molecules are incorporated in a crystal lattice structure, also known as pseudopolymorphic form.

The crystalline form of the compounds described herein may refer to a solid form substantially exhibiting three-dimensional order. In certain embodiments, a crystalline form of a solid is a solid form that is substantially not amorphous. In other embodiments, the X-ray powder diffraction (XRPD) pattern of a crystalline form includes one or more sharply defined peaks.

Amorphous forms of the compounds described herein may be solid forms substantially lacking three-dimensional order. In certain embodiments, an amorphous form of a solid is a solid form that is substantially not crystalline. In other embodiments, the X-ray powder diffraction (XRPD) pattern of an amorphous form includes a wide scattering band with a peak at 2θ of, for example, from 20 to 70°, using CuKα radiation. Further embodiments provide the XRPD pattern of an amorphous form that also includes one or more peaks attributed to crystalline structures. In particular embodiments, the maximum intensity of any one of the one or more peaks attributed to crystalline structures observed at a 2θ of from 20 to 70° is not more than 300-fold, not more than 100-fold, not more than 30-fold, not more than 10-fold, or not more than 3-fold of the maximum intensity of the wide scattering band. Further embodiments provide the XRPD pattern of an amorphous form that includes no peaks attributed to crystalline structures.

Polymorphs or polymorphic forms of the compounds may be crystalline forms of the compound (or a salt, hydrate, or solvate thereof). Typically, all polymorphic forms have the same elemental composition. Different crystalline forms usually have different X-ray diffraction patterns, infrared spectra, melting points, density, hardness, crystal shape, optical and electrical properties, stability, and solubility. Recrystallization solvent, rate of crystallization, storage temperature, and other factors may cause one crystal form to dominate. Various polymorphic forms of a compound can be prepared by crystallization under different conditions.

The term "effective amount" or "therapeutically effective amount" of an agent (e.g., anxiolytics, benzodiazepine, alprazolam, stimulants, dextroamphetamine), as used herein, is that amount sufficient to effect beneficial or desired results, such as clinical results, and, as such, an "effective amount" depends upon the context in which it is being applied. In some embodiments, the compounds are administered in an effective amount for the treatment or prophylaxis of a disease, disorder, or condition. In another embodiment, in the context of administering an agent that treats a central nervous system disorder, disease, or condition, an effective amount of an agent is, for example, an amount sufficient to achieve alleviation or amelioration or prevention or prophylaxis of one or more symptoms or conditions; diminishment of the extent of the disease, disorder, or condition; stabilized (i.e., not worsening) state of the disease, disorder, or condition; prevention of the spread of the disease, disorder, or condition; postponement or reduction of the progression of the disease, disorder, or condition; amelioration of the disease, disorder, or condition; and remission (whether partial or total), whether detectable or undetectable, as compared to the response obtained without administration of the agent.

Typically, the treatment of a disease, disorder, or condition (e.g., a CNS disorder or condition described herein according to DSM-IV; or disorder or the conditions described herein such as sexual disorders, HSDD according to (DSM)-III and DSM-IV (also known as "Female sexual interest/arousal disorder" (FSIAD) according to DSM-5), anxiety disorders according to DSM-IV or DSM-5 (having symptoms including excessive anxiety and worry occurring more days than not for at least 6 months, difficulty controlling worry, anxiety and worry associated with 3 or more of: restlessness or feeling on edge, being easily fatigued, difficulty concentrating or mind going blank, irritability, muscle tension, sleep disturbance; where the anxiety or worry is not due to Axis I disorders, e.g., mood disorders, eating disorders, psychotic disorders, dissociative disorders, substance use disorders; or explained by another mental disorder, or attributable to the physiological effects of a substance or other medical condition; or the anxiety, worry, and/or physical symptoms cause clinically significant distress or impairment in social, occupational, or other areas of functioning), panic disorder according to DSM-IV, PTSD according to DSM-IV or DSM-5, traumatic brain injury disorders, stress-related disorders, attention deficit hyperactivity disorder (ADHD) (or attention deficit disorder (ADD)) according to DSM-IV or DSM-5, impulse-control disorders, TBI according to DSM-5, depression or depressive disorder according to DSM-IV or DSM-5, personality changes (DSM-5), mood disorders (DSM-IV or DSM-5), sleep disorders, shift work disorder, narcolepsy, hypersomnia according to DSM-IV, memory loss, dementia or major neurocognitive disorder (DSM-5), Alzheimer's Disease, Dementia with Lewy Bodies (DLB), Parkinson's Disease Dementia, Frontotemporal Dementia (FTD), Vascular dementia, Huntington's Disease, Creutzfeldt-Jakob Disease, weight management disorders, eating disorders or binge eating disorders (BEDs) according to DSM-5 (i.e., recurrent and persistent episodes of binge eating, having 3 or more of the following episodes of eating: much more rapidly than normal, until feeling uncomfortably full, large amounts of food when not feeling physically hungry, alone because of being embarrassed by how much one is eating, and/or feeling disgusted with oneself, depressed, or very guilty after overeating; marked distress regarding binge eating; absence of regular compensatory behaviors (such as purging)), bulimia, obesity, etc., or combinations thereof) is an approach for obtaining beneficial or desired results, such as clinical results. Beneficial or desired results can include, but are not limited to, alleviation or amelioration of one or more symptoms or conditions; diminishment of extent of disease, disorder, or condition; stabilized (i.e., not worsening) state of disease, disorder, or condition; preventing spread of disease, disorder, or condition; delay or slowing the progress of the disease, disorder, or condition; amelioration or palliation of the disease, disorder, or condition; and remission (whether partial or total), whether detectable or undetectable. "Palliating" a disease, disorder, or condition means that the extent and/or undesirable clinical manifestations of the disease, disorder, or condition are lessened and/or time course of the progression is slowed or lengthened, as compared to the extent or time course in the absence of treatment.

Treatment may result in a "positive outcome" in, for example, HSDD as determined by an increase of satisfying sexual events (SSEs). The increase in frequency of the SSEs is considered to be the best measure of a positive outcome in treating HSDD. For example, an increase in frequency of the SSEs may be from zero SSEs per week to 1 or more SSEs per week would be considered a positive outcome. An increase in sexual desire, interest, libido, or arousal would also be considered a positive outcome of treatment for HSDD. HSDD is most prevalent in female subjects, including but not limited to premenopausal and postmenopausal females; however, HSDD may also occur in male subjects. Treatment in PTSD subjects could be monitored and determined as a decrease: in anxiety events, such as but not limited to, flashbacks or nightmares, in feelings of nervousness, irritability, anger, aggression, or anxiety, in emotional numbness, anti-social behaviors, or avoidance of reminders of the trauma, in sleep issues, for example, insomnia or difficulty sleeping, or in other symptoms of PTSD. Treatment of anxiety disorders other than PTSD, such as but not limited to, ADHD (including conditions with or without hyperactivity, or the former term, ADD), may be determined by a decrease in: inattention, inability to focus, disorganization, hyperactivity, constant movement, excessive fidgeting, tapping, or talking, restlessness, impulsivity, difficulty sustaining focus, disorganization, inability to delay gratification, and the like. In the treatment of dementia, a positive outcome would be decreases in the symptoms or physical causes of dementia. For example, subjects with Alzheimer's disease treated with the combination of active ingredients described herein may have a positive outcome defined as a decrease in: plaques, tangles, beta-amyloid protein, tau protein, infectious prions, and/or injured or degenerated nerve cells in the brain; Lewy body proteins; degeneration of nerve cells and their connections, particularly in those regions of the brain associated with personality, behavior, and language (i.e., frontal and temporal lobes); memory loss, visual hallucinations, inability or problems with focusing, paying attention, reasoning, problem-solving, handling complex tasks, planning, organizing, the decline in cognitive or thinking skills, depression, anxiety, paranoia, agitation, inappropriate behavior, and the like, or combinations thereof. A subject suffering from a weight management disorder, such as for example, an eating disorder or binge eating disorder, bulimia nervosa or bulimia, obesity, may have an increased appetite, compulsive behavior of eating or binge eating, an inability to control or stop from overeating, obsession with food, thoughts about eating or not eating, weight loss, dieting, and/or body image, or a deficiency in leptin hormone. Methods of treating subjects with weight disorders or eating disorders using the combination of active ingredients described herein, may result in positive outcomes as determined by an increase in: leptin, appetite control, lean body mass; and/or decrease in: BMI, weight, waist circumference, body fat percentage, appetite, compulsive behavior of eating or binge eating, emotional eating, or the like, or combinations thereof.

As used herein, the term "subject" refers to any organism to which a composition and/or compound in accordance with the disclosure may be administered, e.g., for experimental, diagnostic, prophylactic, and/or therapeutic purposes. Typical subjects include any animal (e.g., mammals such as mice, rats, rabbits, non-human primates, and humans, etc.). A subject in need thereof is typically a subject for whom it is desirable to treat a disease, disorder, or condition as described herein. For example, a subject in need thereof may seek or be in need of treatment, require treatment, be receiving treatment, may be receiving treatment in the future, or a human or animal that is under care by a trained professional for a particular disease, disorder, or condition.

Compositions

In one embodiment, a composition of the disclosure comprises at least one anxiolytic, at least one stimulant, and a pharmaceutically acceptable carrier, including but not limited to, a vehicle, excipient, diluent, and the like. The combination of an anxiolytic and a stimulant for the treatment of disorders, including central nervous system (CNS) disorders, that are due to either overstimulation or under stimulation would seem contradictory. In fact, the combination of the anxiolytic and the stimulant described here may be further contradictory in view of the side effects of an active ingredient that exacerbates one of the conditions being treated in a subject. Yet, embodiments of the disclosure provide the combination of active ingredients; compositions comprising at least one anxiolytic, at least one stimulant, and a pharmaceutically acceptable carrier; and methods of treating a condition in a subject (e.g., CNS disorders, HSDD, PTSD, depression or depressive disorders, anxiety disorders, ADHD, panic disorders, memory loss, dementia, Alzheimer's, conditions related to problems with focusing and concentration, particularly due to a traumatic brain injury, seep disorders, hypersomnia, narcolepsy, shift work disorders, weight management disorders, obesity, bulimia, etc.) by administering these compositions or the combination of at least one anxiolytic and at least one stimulant are provided here.

The present disclosure provides a composition comprising: at least one anxiolytic; at least one stimulant; and a pharmaceutically acceptable carrier. In one embodiment, the anxiolytic is benzodiazepine, or a pharmaceutically acceptable salt, enantiomer, mixture of enantiomers, or racemic mixture of the benzodiazepine, and/or a prodrug of any of the foregoing. Another embodiment provides a benzodiazepine is selected from alprazolam, lorazepam, chlordiazepoxide, diazepam, or a combination thereof. A further embodiment may be directed to a benzodiazepine dosage amount of 0.25 mg or greater; 10 mg or less; or 0.25 mg to 10 mg. In yet other embodiments, the stimulant is amphetamine, or a pharmaceutically acceptable salt, enantiomer, mixture of enantiomers, or racemic mixture of the amphetamine, and/or a prodrug of any of the foregoing. One embodiment provides an amphetamine selected from levoamphetamine, dextroamphetamine, dextroamphetamine saccharate, amphetamine aspartate monohydrate, dextroamphetamine sulfate, amphetamine sulfate, amfecloral, amphetaminil, benzphetamine, clobenzorex, D-deprenyl, dimethylamphetamine, ethylamphetamine, fencamine, fenethylline, fenproporex, furfenorex, lisdexamfetamine, lisdexamfetamine dimesylate, mefenorex, mesocarb, prenylamine, selegiline, and the like, or a combination thereof. A further embodiment is directed to an amphetamine dosage amount of 1 mg or greater; 60 mg or less, or 0.25 mg to 60 mg. Another embodiment provides an anxiolytic that is benzodiazepine and a stimulant that is amphetamine. More particularly, in a further embodiment, the anxiolytic is alprazolam and the stimulant is dextroamphetamine. Yet another embodiment relates to the relative weight ratio of the benzodiazepine and the amphetamine ranging from 1:10 to 1:100.

In other embodiments, the composition of the disclosure is an oral composition comprising 0.25 mg-0.5 mg alprazolam and 10 mg-20 mg dextroamphetamine, where the composition is formulated for oral administration. The oral composition may be in the form selected from: a pill, tablet, a caplet, a capsule, a lozenge, a syrup, a suspension, and the like. In some embodiments, the composition is contained in a pharmaceutical dosage form. Another embodiment provides for the composition described here that is an oral composition comprising 0.25 mg alprazolam and 10 mg dextroamphetamine.

Anxiolytics, also known as anti-anxiety drugs, are those that prevent, inhibit, reduce, or relieve anxiety in anxiety-related disorders. These anti-anxiety drugs may target chemical messengers in the brain to decrease abnormal excitability. For example, benzodiazepines are one type of anxiolytic, that reduces anxiety symptoms. Benzodiazepines depress the central nervous system (CNS) by enhancing the effects of a major inhibitory neurotransmitter, i.e., gamma-aminobutyric acid (GABA). GABA is known for its role in communication between nerve cells and also the reduction of brain activity. It is thought that excessive brain activity may result in anxiety or other disorders that present with anxiety symptoms. Other embodiments of the disclosure provide for compositions comprising at least one anxiolytic that is a benzodiazepine, or a pharmaceutically acceptable salt, enantiomer, mixture of enantiomers, or racemic mixture of the benzodiazepine, and/or a prodrug of any of the foregoing. In a further embodiment, the benzodiazepine in the composition may be selected from alprazolam, lorazepam, diazepam, chlordiazepoxide, clorazepate, oxazepam, clonazepam, temazepam, triazolam, flurazepam, estazolam, or the like, or combinations thereof, or a pharmaceutically acceptable salt, enantiomer, mixture of enantiomers, or racemic mixture of the benzodiazepine, and/or a prodrug of any of the foregoing. Commercially available benzodiazepines, particularly alprazolam, include XANAX®, XANAX XR®, NIRAVAM®, ALPRAZOLAM INTENSOL®, GABAZOLAMINE-05, and ALTI-ALPRAZOLAM, where the dosage forms may be in, but not limited to, tablet (e.g., disintegrating, extended release) or solution form.

Another embodiment of the composition provides at least one stimulant selected from an amphetamine, or a pharmaceutically acceptable salt, enantiomer, mixture of enantiomers, or racemic mixture of the amphetamine, and/or a prodrug of any of the foregoing. Furthermore, the amphetamine may include, but is not limited to, levoamphetamine, dextroamphetamine, dextroamphetamine saccharate, amphetamine aspartate, dextroamphetamine sulfate, amphetamine sulfate, amphetamine sulfate, amphetamine aspartate monohydrate, lisdexamfetamine dimesylate, or the like, or a combination thereof, or a pharmaceutically acceptable salt, enantiomer, mixture of enantiomers, or racemic mixture of the amphetamine, and/or a prodrug of any of the foregoing. For example, a compound, such as dextroamphetamine described herein can also be administered in a prodrug form (e.g., lisdexamfetamine dimesylate) which is converted into its active metabolite, or more active metabolite in vivo. Non-limiting examples of amphetamine or methamphetamine prodrugs include amfecloral, amphetaminil, benzphetamine, clobenzorex, D-deprenyl, dimethylamphetamine, ethylamphetamine, fencamine, fenethylline, fenproporex, furfenorex, lisdexamfetamine, lisdexamfetamine dimesylate, mefenorex, mesocarb, prenylamine, and selegiline. Commercially available amphetamines, particularly dextroamphetamines, include, but are not limited to, DEXEDRINE®, DEXEDRINE® Spansules, DEXTROSTAT®, ADDERALL®, ADDERALL XR®, LIQUADD, PROCENTRA®, METAMINA, MYDAYIS®, ATTENTIN, AMFEXA, and ZENZEDI®, where the dosage forms may be in, but not limited to, tablet, capsule, spansule, or solution.

As used herein, a therapeutically effective amount of an active ingredient, such as but not limited to, an anxiolytic, benzodiazepine, alprazolam, lorazepam, chlordiazepoxide, diazepam; a stimulant, amphetamine, levoamphetamine, dextroamphetamine, dextroamphetamine saccharate, amphetamine aspartate monohydrate, dextroamphetamine sulfate, amphetamine sulfate, lisdexamfetamine dimesylate, and the like, or combinations thereof, or a pharmaceutically acceptable salt, enantiomer, mixture of enantiomers, or racemic mixture of the amphetamine, and/or a prodrug of any of the foregoing. For purposes of this disclosure, an effective amount refers to the amount of the active ingredient (s) that prevents, alleviates, reduces, eliminates, or interferes with at least one of the symptoms associated with a central nervous system (CNS) disorder. Non-limiting examples of central nervous system disorders include: sexual disorders, e.g., hypoactive sexual desire disorder, anxiety disorders, traumatic brain injury disorders, stress related disorders, post-traumatic stress disorder, attention deficit or hyperactivity disorder, impulse-control disorders, addiction, depression, sleep disorders, shift work disorder, narcolepsy, hypersomnia, memory loss, dementia, weight management disorders, obesity, bulimia, etc. or combinations of any of the foregoing. When a subject reports of symptoms related to any of the CNS disorders, a physician may readily determine when symptoms are prevented, alleviated, decreased or reduced, or eliminated, for example by clinical observation of a subject, or through self-reporting of symptoms by the subject during the course of a treatment. A person of ordinary skill in the art, such as a physician, may readily determine and prescribe a therapeutically effective amount of a composition, comprising the active ingredients disclosed herein, to be administered to the subject, by considering factors such as the size, weight, age and sex of the subject, the nature and extent of the symptoms, disease penetration, or persistence and severity of symptoms, frequency of treatment, route of administration, and the desired effect. In the case of therapeutic agents, these terms most often refer to a measurable, statistically significant reduction in an occurrence, frequency, or severity of one or more symptom(s) of a specific CNS disorder, diseases, or conditions, associated with or caused by the targeted disorder. A medical practitioner skilled in the art would appreciate and readily ascertain the proper dosage that is therapeutically effective for preventing, reducing, alleviating, decreasing or reducing, or eliminating symptoms of a condition in a subject, including for example, a CNS disorder, disease, or condition.

In some embodiments, the active ingredient of at least one benzodiazepine and at least one amphetamine may be in a therapeutically effective amount to treat, reduce, alleviate, prevent, or eliminate symptoms of a CNS disorder, where the benzodiazepine is in a dosage amount of 0.1 mg (e.g., 0.25 mg, 0.5 mg, 1 mg, 2 mg, 3 mg, 4 mg, 5 mg, 6 mg, 7 mg, 8 mg, 9 mg, 10 mg, etc.) or greater. Other embodiments provide benzodiazepine dosage amounts of 10 mg (e.g., 5 mg, 4.5 mg, 4 mg, 3.5 mg, 3 mg, 2.5 mg, 1.5 mg, 0.75 mg, 0.5 mg, etc.) or less. Further embodiments may be directed to the compositions comprising at least one benzodiazepine having a dosage amount of 0.25 mg to 10 mg (e.g., 0.5 mg to 8 mg, 1 mg to 6 mg, 1.5 mg to 5 mg, 2 mg to 3 mg, etc.).

Yet in another embodiment, the active ingredient of at least one benzodiazepine and at least one amphetamine may be in a therapeutically effective amount to treat, reduce, alleviate, prevent, or eliminate symptoms of a CNS disorder, where the at least one amphetamine is in a dosage amount of 0.5 mg (e.g., 1 mg, 1.25 mg, 1.5 mg, 2 mg, 2.5 mg, 3 mg, 5 mg, 6 mg, 7 mg, 8 mg, 9 mg, 10 mg, 11 mg, 12 mg, 13 mg, 15 mg, 19 mg, 20 mg, 25 mg, 30 mg, 35 mg, 40 mg, 45 mg, 50 mg, 55 mg, etc.) or greater. Another embodiment may provide amphetamine dosage amounts of 60 mg (e.g., 57.5 mg, 52.5 mg, 47.5 mg, 42.5 mg, 37.5 mg, 32.5 mg, 27.5 mg, 22.5 mg, 17.5 mg, 13.5 mg, 12.5 mg, 7.5 mg, 5 mg, 2.5 mg, 1 mg, etc.) or less. Other embodiments may provide amphetamine dosage amounts of 0.25 mg to 60 mg (e.g., 0.5 mg to 55 mg, 1 mg to 40 mg, 5 mg to 20 mg, 10 mg to 50 mg, 15 mg to 45 mg, 20 mg to 40 mg, 25 mg to 35 mg, etc.).

A further embodiment provides for active ingredients, i.e., at least one benzodiazepine and at least one amphetamine, in a therapeutically effective amount to treat, reduce, alleviate, prevent, or eliminate symptoms of a CNS disorder, where the combined active ingredient dosage amount is: 0.5 mg to 100 mg (e.g., 0.6 mg to 90 mg, 1 mg to 80 mg, 1.1 mg to 70 mg, 5 mg to 60 mg, 7 mg to 50 mg, 8 mg to 40 mg, 10.25 mg to 30 mg, 10.5 mg to 20.5 mg, 10.25 mg to 10.5 mg, etc.).

By means of general guidance, when the active ingredient compounds of a first component and a second component are administered in combination, the dosage amount of each component may be reduced by about 70-80% relative to the usual dosage of the component when it is administered alone as a single agent for the treatment of CNS disorders associated with excessive levels of brain activity, in view of the synergistic effects of the combination. The combination of active ingredients of the disclosure may be formulated in such a manner that, although the active ingredients are combined in a single dosage unit, the physical contact between the active ingredients is minimized. For contact to be minimized, for example, where the composition or formulation is orally administered, one or more of the active ingredients may be coated enterically. By enteric coating one of the active ingredients, contact between the combined active ingredients may be minimized, but also, the release of one of these active ingredients in an oral formulation may be controlled in the gastrointestinal tract so that one of these actives is released in the intestines and not released in the stomach. A further embodiment of the disclosure provides an orally administered pharmaceutical composition one or more active ingredients is coated with a sustained-release material. As is understood, the sustained-release coating allows for the sustained-release of that active ingredient throughout the gastrointestinal tract and also assists in minimizing physical contact between the combined active ingredients in one embodiment. Another embodiment may be directed to a sustained-released active ingredient that may be additionally enteric coated to provide for the release of this active ingredient that occurs only or primarily in the intestine. Yet another method would involve the formulation of a combination composition in which the one or more active ingredients is coated with a sustained-release and/or enteric-release polymer, and the other active ingredient is also coated with a polymer such as, for example, a low viscosity grade of hydroxypropyl methylcellulose or other appropriate materials as known in the art, in order to further isolate the active ingredients. The polymer coating acts to form another barrier from interacting with the other active ingredient.

In one embodiment, dosage forms of the composition comprising a combination of active ingredients of the disclosure, where one active ingredient is enteric coated may be in the form of tablets such that the enteric coated active ingredient and the other active ingredient are mixed or blended together and then compressed into a tablet or tablet-like form, or such that the enteric coated active ingredient is compressed into one tablet layer and the other active ingredient is compressed into a different layer of the formulation. Other embodiments may provide for further separated layers, such that one or more placebo layers may be present where the placebo layer is between the layers of active ingredients. In yet another embodiment, pharmaceutical composition dosage forms of the disclosure may be in the form of capsules where one active ingredient is compressed into a tablet or in the form of a plurality of microtablets, particles, or granules, which are then enteric coated. These enteric coated microtablets, particles, or granules are then placed into a capsule or compressed into a capsule along with the other active ingredient in granular form.

In one embodiment, the composition may comprise at least one anxiolytic that is benzodiazepine, at least one stimulant that is amphetamine, and a pharmaceutically acceptable carrier. Another embodiment provides at least one anxiolytic that is alprazolam, at least one stimulant that is dextroamphetamine, and a pharmaceutically acceptable carrier. In some embodiments, the pharmaceutical composition or dosage form of the disclosure comprises alprazolam, dextroamphetamine, and a pharmaceutically acceptable carrier. Other embodiments may provide a pharmaceutical composition or dosage form of the disclosure comprising alprazolam and/or a prodrug of alprazolam, dextroamphetamine and/or a prodrug of dextroamphetamine, and a pharmaceutically acceptable carrier.

Another embodiment may provide for a composition comprising at least one anxiolytic and at least one stimulant, where the relative weight ratio of the anxiolytic and the stimulant is in a range of 1:10 to 1:100 (e.g., 1:20, 1:40, 1:80, etc.) or the relative weight ratio of the stimulant to the anxiolytic is in a range of 100:1 to 10:1 (e.g., 80:1, 40:1, 20:1, etc.). Other embodiments may be directed to the relative weight ratio of benzodiazepine and amphetamine in a range of 1:10 to 1:100 (e.g., 1:20, 1:40, 1:80, etc.) or the relative weight ratio of amphetamine and benzodiazepine in a range of 100:1 to 10:1 (e.g., 80:1, 40:1, 20:1, etc.). The pharmaceutical composition is, in certain embodiments, an oral composition comprising active ingredients and a pharmaceutically acceptable carrier, where the active ingredients are: 0.25 mg-005 mg alprazolam and 10 mg-20 mg dextroamphetamine. In certain embodiments, the oral composition described here is contained in a pharmaceutical dosage form. The oral composition disclosed here may comprise 0.25 mg alprazolam and 10 mg dextroamphetamine, where the oral composition is contained in a pharmaceutical dosage form.

Yet another embodiment may be directed to a combination of a triazolo analog of 1,4-benzodiazepine compounds, such as alprazolam (i.e., 8-chloro-1-methyl-6-phenyl-4H-benzo[f][1,2,4]triazolo[4,3-a][1,4]diazepine); and a dextroamphetamine sulfate or a combination of dextroamphetamine saccharate, dextroamphetamine sulfate, amphetamine sulfate, Amphetamine Aspartate Monohydrate Equivalent. Where this combination of active ingredients may be in an amount effective to treat a condition, such as a CNS disorder or CNS-related disorder, in a subject, and the alprazolam is in an amount of: 0.1 mg (e.g., 0.25 mg, 0.5 mg, 1 mg, 2 mg, 3 mg, 4 mg, 5 mg, 6 mg, 7 mg, 8 mg, 9 mg, 10 mg, etc.) or greater; 10 mg (e.g., 5 mg, 4.5 mg, 4 mg, 3.5 mg, 3 mg, 2.5 mg, 1.5 mg, 0.75 mg, 0.5 mg, etc.) or less; 0.25 mg to 10 mg (e.g., 0.5 mg to 8 mg, 1 mg to 6 mg, 1.5 mg to 5 mg, 2 mg to 3 mg, etc.); or 0.25 mg or 0.5 mg; the dextroamphetamine sulfate is in an amount of: 0.5 mg (e.g., 1 mg, 1.25 mg, 1.5 mg, 2 mg, 2.5 mg, 3 mg, 5 mg, 6 mg, 7 mg, 8 mg, 9 mg, 10 mg, 11 mg, 12 mg, 13 mg, 15 mg, 19 mg, 20 mg, 25 mg, 30 mg, 35 mg, 40 mg, 45 mg, 50 mg, 55 mg, etc.) or greater; 60 mg (e.g., 57.5 mg, 52.5 mg, 47.5 mg, 42.5 mg, 37.5 mg, 32.5 mg, 27.5 mg, 22.5 mg, 17.5 mg, 13.5 mg, 12.5 mg, 7.5 mg, 5 mg, 2.5 mg, 1 mg, etc.) or less; 0.25 mg to 60 mg (e.g., 0.5 mg to 55 mg, 1 mg to 40 mg, 5 mg to 20 mg, 10 mg to 50 mg, 15 mg to 45 mg, 20 mg to 40 mg, 25 mg to 35 mg, etc.); or 10 mg or 20 mg. In those instances where a combination of stimulants is used, the amount of amphetamine is: 1 mg (e.g., 1.25 mg, 1.5 mg, 1.875 mg, 2.5 mg, 3 mg, 3.125 mg, 3.75 mg, 4.7 mg, 5 mg, 6 mg, 6.3 mg, 7 mg, 7.5 mg, 7.8 mg, 9.4 mg, 10 mg, 12 mg, 12.6 mg, 15 mg, 18 mg, 18.8 mg, 20 mg, 30 mg, etc.) or greater; 60 mg (e.g., 57.5 mg, 52.5 mg, 47.5 mg, 42.5 mg, 37.5 mg, 32.5 mg, 30 mg, 27.5 mg, 22.5 mg, 20 mg, 18.8 mg, 17.5 mg, 15 mg, 13.5 mg, 12.6 mg, 10 mg, 9.4 mg, 7.8 mg, 7.5 mg, 6.3 mg, 5 mg, 4.7 mg, 3.75 mg, 3.13 mg, 3.125 mg, 2.5 mg, 1.875 mg, 1.25 mg, 1 mg, etc.) or less; 1 mg to 30 mg (e.g., 1.1 mg to 20 mg, 1.25 mg to 18.8 mg, 1.875 mg to 15 mg, 2.5 mg to 12.6 mg, 3.13 mg to 12.5 mg, 4.7 mg to 10 mg, 5 mg to 9.4 mg, 6.3 mg to 7.8, etc.).

Another embodiment provides for a composition comprising an effective amount of at least one anxiolytic, an effective amount of at least one stimulant, and a pharmaceutically acceptable carrier (e.g., vehicle, excipient, diluent), where the at least one anxiolytic is selected from: XANAX® or XANAX XR®; and the at least one stimulant is selected from: DEXEDRINE®, DEXEDRINE® extended-release, ADDERALL®, or ADDERAL XR®. In some embodiments, the composition may comprise an effective amount of XANAX® (e.g., 0.25 mg-1 mg given 1 or more times a day to a recommended maximum of 4 mg/day) or an effective amount of XANAX® (e.g., 0.5 mg-10 mg once daily; 0.5 mg-6 mg once daily; 1 mg-3 mg once daily to a recommended maximum of 10 mg/day); and an effective amount of ADDERALL® (2.5 mg-5 mg to a recommended maximum of 40 mg/day given 1 or more times a day, where the doses are given at intervals of 4 to 6 hours, where the first dose is typically taken in the morning); an effective amount of ADDERALL XR® (e.g., 5 mg-30 mg or 10 mg-20 mg given once daily to a recommended maximum of 30 mg/day), where the dose is typically taken in the morning; an effective amount of DEXEDRINE® (e.g., 2.5 mg-5 mg given 1 or more times a day, where the doses are given at intervals of 4 to 6 hours, where the dose is typically taken in the morning); or an effective amount of DEXEDRINE® extended release (e.g., 5 mg or more once a day to a recommended maximum of 40 mg/day).

A further embodiment may be directed to the composition described herein, where the composition is formulated for oral administration. Various oral formulations include but are not limited to a pill, a tablet (e.g., an orally disintegrating tablet, orally dissolving tablet, sustained-release tablet, sugar-coated tablet, film-coated tablet, enteric-coated tablet), a caplet, a capsule (e.g., sustained-release capsule, spansule), a lozenge, a syrup or an elixir, or a suspension, or any other oral formulation found to be an effective way for administering the active ingredients or composition comprising the active ingredients of the disclosure. In some embodiments, the oral composition may be a formulation selected from: an immediate-release dosage, a controlled-release, a modified-release dosage, a sustained-release dosage, a delayed-release dosage, an extended-release dosage, a long-acting release dosage, a prolonged-release dosage, a timed-release dosage, etc.

Another embodiment may be directed to formulations prepared for administration of the active ingredients, e.g., benzodiazepine and amphetamine, or compositions containing the active ingredients disclosed herein, by injection (e.g., subcutaneous, intravenous, parenterally, intraperitoneally, intrathecal), inhalation, or orally, rectally, or transdermally.

Briefly, formulations are typically prepared by mixing at least one active ingredient and a carrier, diluent, or excipient. Suitable carriers, diluents, and excipients are commonly known to those of ordinary skill in the art and include materials such as carbohydrates, waxes, water soluble and/or polymers capable of swelling, hydrophilic or hydrophobic materials, oils, water, solvents, gelatin, and the like. A person of ordinary skill in the art would understand how to select a particular carrier, diluent, or excipient for use in the composition described herein, and selection would depend upon the purpose of the composition. Solvents may generally be selected based on solvents recognized by persons of ordinary skill in the art as being safe (i.e., Generally Recognized As Safe (GRAS)) to be administered to a mammal. Typically, safe solvents are non-toxic aqueous solvents, such as but not limited to, water and other non-toxic solvents that are soluble or miscible in water. Non-limiting examples of suitable aqueous solvents include water, ethanol, propylene glycol, polyethylene glycols (PEG) (e.g. PEG300, PEG400), etc., and mixtures or combinations thereof. The disclosed formulations may also include one or more: buffers, wetting agents, lubricating agents, emulsifiers, stabilizing agents, surfactants, suspending agents, preservatives, antioxidants, opaquing agents, glidants, processing aids, colorants, sweeteners, flavoring agents, and other known additives to provide a well-designed drug (i.e., active ingredients of the present disclosure, or a pharmaceutical composition thereof), both aesthetically and functionally, or aid in the manufacture of the pharmaceutical composition, formulation, dosage form, or product (i.e., medicament). The additional ingredients in the disclosed formulations may include inactive ingredients such as, but not limited to, cellulose, microcrystalline cellulose, ethylcellulose, corn starch, gelatin, hydroxypropyl methylcellulose (HPMC), docusate sodium, lactose, lactitol, magnesium stearate, silicon dioxide, colloidal silicon dioxide, sodium benzoate, povidone, sodium lauryl sulfate, calcium sulfate, dibutyl sebacate, cetyl alcohol, polyethylene glycol, D&C Yellow No. 10, D&C Yellow No. 10 aluminum lake, FD&C Yellow No. 6, FD&C Yellow No. 6 aluminum lake, FD&C Blue No. 1, FD&C Blue No. 1 aluminum lake, FD&C Blue No. 2, FD&C Red No. 40, FD&C Red No. 40 aluminum lake, sugar, sugar spheres, compressible sugar, and trace amounts of other ingredients.

The formulations of the disclosure may be prepared using conventional dissolution and mixing procedures. For example, the bulk drug(s) (i.e., active ingredient or compound of the disclosure or stabilized form of the active ingredient) may be dissolved in a suitable solvent with one or more of the excipients described above. Under certain circumstances, an active ingredient may be poorly soluble in water (i.e., a poor water-soluble compound). In order to increase the dissolution rate, the formulation may be designed to decrease the particle size of the active ingredient, increase the temperature of a solvent and/or increase the rate of mixing or stirring when preparing the formulation. The drugs or active ingredients of the disclosure are typically formulated into pharmaceutical dosage forms thereby providing a dosage of the drugs that is easily controlled and for a subject, a manageable pharmaceutical product.

Where the route of administration is by injection, some embodiments may provide a bolus or continuous infusion. In accordance with the selected route of administration, a composition or formulation described herein may be coated with or disposed in a selected material to protect it from any detrimental conditions that could affect its ability to perform its intended function. A compound, composition, or formulation described here may be administered alone, or in conjunction with either another agent or with a pharmaceutically-acceptable carrier, or both. A compound or composition described herein can be administered prior to the administration of the other agent, simultaneously with the agent, or after the administration of the agent.

Unless otherwise indicated, any reference to a compound, active ingredient, or drug described herein, such as benzodiazepine, alprazolam, lorazepam, diazepam, chlordiazepoxide, clorazepate, oxazepam, clonazepam, temazepam, triazolam, flurazepam, estazolam, amphetamine, levoamphetamine, dextroamphetamine, dextroamphetamine saccharate, amphetamine aspartate monohydrate, dextroamphetamine sulfate, amphetamine sulfate, or lisdexamfetamine dimesylate, by structure, name, or any other means, includes pharmaceutically acceptable salts; alternate solid forms, such as polymorphs, solvates, hydrates, etc.; tautomers; or any chemical species that may rapidly convert to a compound described herein under conditions in which the compounds are used as described here.

Methods

Conditions of the disclosure include, but are not limited to, central nervous system (CNS) disorders, diseases, or conditions are known to include neurological disorders that affect the brain or spinal cord or its function. Neurological disorders may include any disorder of the nervous system, including any abnormalities to the structure, including biochemical or electrical. Non-limiting examples of CNS disorders and/or their symptoms include a depression or depressive disorder, a sexual disorder, a hypoactive sexual desire disorder (HSDD) according to *Diagnostic and Statistical Manual of Mental Disorders* (DSM)-III and DSM-IV (also known as "Female sexual interest/arousal disorder" (FSIAD) according to DSM-5), a sleep disorder, hypersomnia according to DSM-IV, an anxiety disorder, a post-traumatic stress disorder (PTSD), narcolepsy according to DSM-5 criteria (recurrent periods of irrepressible need to sleep, lapsing into sleep, or napping within the same day that occurs at least 3 times per week over a 3 months period; episodes of cataplexy occurring at least a few times per month; hypocretin deficiency as measured by cerebrospinal fluid (CSF) hypocretin-I immunoreactivity values of one-third or less of those of control, or 110 pg/mL or less; nocturnal sleep polysomnography (PSG) showing rapid eye movement (REM) sleep latency of 15 minutes or less, or a multiple sleep latency test (MSLT) showing a MSL of 8 minutes or less and more than 2 sleep onset rapid eye movement periods (SOREMPs)), attention deficit hyperactivity disorder (ADHD) according to DSM-IV (with hyperactivity, or without hyperactivity formerly referred to as attention deficit disorder (ADD)) ADHD (DSM-5) comprising subcategories: 1) Predominantly Inattentive type (also called, ADD; having dominant symptoms of difficulties with paying attention and remaining focused on a task), 2) Predominantly Hyperactive-Impulsive type (having dominant symptoms of excessive movement or restless mental activity and/or problems with impulsive, imprudent, sudden, or thoughtless actions), and 3) Combination type of the other two types (having no dominant symptoms but fairly equal balance of Types 1 and 2), a memory loss disorder, traumatic brain injury (TBI) according to DSM-5, Neurocognitive Disorder due to TBI, dementia or major neurocognitive disorder (DSM-5), Alzheimer's Disease, Dementia with Lewy Bodies (DLB) or Neurocognitive Disorder with Lewy Bodies, Parkinson's Disease Dementia or Neurocognitive Disorder due to Parkinson's Disease, Frontotemporal Dementia (FTD) or Frontotemporal neurocognitive disorder, Vascular dementia, Huntington's Disease Dementia or Neurocognitive Disorder due to Huntington's Disease, Creutzfeldt-Jakob Disease, unspecified neurocognitive disorder, weight management disorder, increased appetite, obesity, bulimia, being overweight, and the like, or combinations of any of the foregoing.

Embodiments of the disclosure provide for methods of treating a condition in a subject, where treatment includes the prevention, alleviation, the decrease or reduction, or elimination of symptoms of any of the conditions. A medical practitioner, or the subject, may readily determine the success of treatment by clinical observation of the subject, or through self-reporting of symptoms by the subject during the course of a treatment.

In one embodiment, a method of treating a condition in a subject comprises administering active ingredients alone or in a composition, where the composition comprises: at least one anxiolytic, at least one stimulant, and a pharmaceutically acceptable carrier, vehicle, diluent, excipient, or the like, and the condition may include a CNS disorder that is selected from a depression disorder according to DSM-IV or DSM-5, a depressive disorder according to DSM-5, a post-traumatic stress disorder (PTSD) according to DSM-IV or DSM-5, a hypoactive sexual desire disorder (HSDD) according to DSM-IV, hypersomnia according to DSM-IV, attention deficit hyperactivity disorder (ADHD) (or attention deficit disorder (ADD)) according to DSM-IV or DSM-5, traumatic brain injury (TBI), dementia, obesity, bulimia, being overweight, etc., where the composition (and/or active ingredients or agents, i.e., at least one anxiolytic, at least one stimulant) is in an amount effective to treat the condition. Depression and chronic depression (according to DSM-IV or DSM-5), as well as personality changes (according to DSM-5) and/or mood disorders (DSM-IV or DSM-5), are often a result of TBIs according to DSM-5. Personality changes are diagnosed by a change in personality that is markedly different in the patient's previous characteristic behavior patterns. The depression disorder may be selected from, but is not limited to: major depressive disorder, minor depression disorder, dysthymia, postpartum depression, seasonal affective disorder, bipolar disorder, mixed anxiety depression, unspecified depression, adjustment disorder, atypical depression, psychotic depression, suicidal ideation, or combinations thereof.

Another embodiment may be directed to the method of treating a condition in a subject, comprising a composition of the disclosure comprising: at least one anxiolytic (e.g., a benzodiazepine, alprazolam, lorazepam, chlordiazepoxide, diazepam, or a combination of any of the foregoing, or a pharmaceutically acceptable salt, enantiomer, mixture of enantiomers, or racemic mixture of the benzodiazepine, and/or a prodrug of any of the foregoing); at least one stimulant (e.g., amphetamine, levoamphetamine, dextroamphetamine, dextroamphetamine saccharate, amphetamine aspartate monohydrate, dextroamphetamine sulfate, amphetamine sulfate, lisdexamfetamine dimesylate, or combinations of any of the foregoing, or a pharmaceutically acceptable salt, enantiomer, mixture of enantiomers, or racemic mixture of the amphetamine, and/or a prodrug of any of the foregoing); and a pharmaceutical carrier (e.g., vehicle, excipient, diluent), wherein the composition comprising the active ingredients is in an amount effective to treat the condition.

CNS disorders appear to be a result of an imbalance of certain chemicals or neurotransmitters, or improper signaling in the brain. Many drugs currently prescribed for such disorders assist by increasing or decreasing the chemicals or signaling necessary to treat the CNS disorders. For example, if there is an imbalance of serotonin in a subject's brain in need thereof, then selective serotonin reuptake inhibitors (SSRIs) are often prescribed to allow for serotonin to be available in the brain, i.e., decrease the reuptake of serotonin in the brain. However, a common side effect of SSRIs is sexual problems, sleeping issues, nervousness, etc. Similarly, the serotonin and norepinephrine reuptake inhibitors (SNRIs) increase serotonin and norepinephrine in the brain. However, drowsiness or fatigue are also common side effects. Monoamine oxidase inhibitors (MAOIs) may work by preventing the breakdown of norepinephrine, dopamine, and serotonin. However, MAOIs interact with many other drugs and at times even foods. Moreover, they cannot be combined with stimulants or other antidepressants.

Combining an anxiolytic and a stimulant may provide greater efficacy, such as a reduction or relief of symptoms associated with sexual disorders, depression, anxiety, sleep disorders, dementia, eating disorders, and the like. For example, benzodiazepines may be prescribed for anxiety or panic disorders, or for sleep problems such as insomnia, which relaxes or reduces nervous tension and anxiety in a subject. Without being bound by theory, to counteract some of the side effects (e.g., drowsiness, trouble concentrating, depression, emotional, mood, or personality changes, weight or appetite changes, loss of sexual desire or decreased libido), a stimulant may be beneficial. These stimulants may work by increasing neurotransmitter availability (e.g., norepinephrine, dopamine), which increases, for example, focus, clarity, and decreases appetite. This combination of an anxiolytic and a stimulant may be particularly beneficial for treating subjects suffering from one or more CNS disorders described here.

A further embodiment provides a method of treating hypoactive sexual desire disorder (HSDD), which is a sexual dysfunction that causes a lowered sex drive, particularly in women. The treatment would prevent, alleviate, reduce, eliminate, block, or interfere with at least one of the symptoms associated with HSDD. Non-limiting symptoms of HSDD include: lack of interest or desire in sexual activity, lack of sexual thoughts or fantasies, disinterest in initiating sexual activities, difficulty obtaining pleasure from sexual activities, and the like, or combinations thereof. For example, in the method of treating HSDD in a subject, the treatment increases interest or desire in or in initiating sexual activity, increases sexual thoughts or fantasies, increases obtaining pleasure from sexual activities, and the like, or combinations of any of the foregoing, in the subject.

Yet another embodiment provides a method of treating post-traumatic stress disorder (PTSD), which is a severe, often chronic, and disabling mental health condition of CNS disorders typically caused by a traumatic event, involving direct or actual injury, or threatened injury. The treatment would prevent, alleviate, reduce, eliminate, block, or interfere with at least one of the symptoms associated with PTSD. Non-limiting symptoms of PTSD include: re-experiencing the trauma through flashbacks or nightmares; emotional numbness and avoidance of people, places or activities that are reminders of the trauma; increased difficulty sleeping and concentrating, feelings of nervousness or jumpiness, irritability, anger, or aggression, or severe anxiety. For example, in the method of treating PTSD in a subject, the treatment decreases re-experiencing the trauma; decreases emotional numbness and avoidance of people, places, or activities; decreases difficulties associated with sleep and concentration, decreases anxiety, decreases feelings of nervousness or jumpiness, decreases irritability, anger, or aggression, and the like, or combinations of any of the foregoing, in the subject.

A further embodiment provides a method of treating an anxiety disorder, such as but not limited to ADHD (which includes conditions with or without hyperactivity, or the former term ADD), which is an impairment of the growth and development of the CNS, i.e., neurodevelopmental disorder. The causes of ADHD may be genetic or environmental (e.g., infections, nutrition, toxins, physical trauma, etc.). The treatment would prevent, alleviate, reduce, eliminate, block, or interfere with at least one of the symptoms associated with ADHD. Non-limiting symptoms of ADHD include inattention, lacking or having difficulty sustaining focus, disorganization; hyperactivity, constant movement, excessively fidgeting, tapping, or talking, or extreme restlessness; impulsivity, hasty actions or decisions, inability to delay gratification, desire for immediate reward, socially intrusive, excessively interrupting others, making decisions without considering long-term consequences; or the like. For example, in the method of treating ADHD in a subject, the treatment decreases inattention, inability to focus, disorganization; decreases hyperactivity, constant movement, extreme restlessness; decreases impulsivity, and the like, or combinations of any of the foregoing, in the subject.

Yet another embodiment provides a method of treating a weight disorder, such as obesity, being overweight in a subject, weight gain, or increased appetite, which may adversely affect the CNS, particularly cognitive function, such as attention, executive function, and the like, as well as cause complications in metabolic syndromes, atherosclerosis, heart disease, high blood cholesterol, high blood pressure, diabetes, cancers, sleep disorders, etc. The treatment would prevent, alleviate, reduce, eliminate, block, or interfere with at least one of the symptoms associated with obesity, being overweight, or weight gain, or the like. Non-limiting symptoms of obesity, being overweight in a subject, weight gain, or increased appetite include weight above the norm, a body mass index (BMI) of 30 or higher indicating obesity (BMI of 30-34.99 is obese class I; BMI of 35-39.99 is obese class II; BMI of 40 or greater is obese class III), or a BMI of 25-29.9 indicating being overweight or pre-obese; a waist circumference size over 40 inches for men and over 35 inches for women, or a waist circumference size more than half of the height of a subject, body fat percentage of greater than 25% for men and over 33% for women define obesity, while 21%-25% for men and 31%-33% for women define borderline obesity, or the like. For example, in the method of treating obesity, being overweight, weight gain, or increased appetite in a subject, the treatment decreases weight or weight gain, BMI, or waist circumference size, or decreases appetite, or the like, or combinations of any of the foregoing, in the subject.

A further embodiment may provide a method of treating hypersomnia or idiopathic hypersomnia, which is a neurological sleep disorder. The treatment would prevent, alleviate, reduce, eliminate, block or interfere with at least one of the symptoms associated with hypersomnia. Non-limiting symptoms of hypersomnia include excessive time spent sleeping or excessive daytime sleepiness (EDS) even with adequate sleep which varies by, for example, age, gender, etc.; an Epworth Sleepiness Scale (ESS) of greater than 10 (e.g., 11, 12, 13, 14, 16, 20, 24); a Stanford Sleepiness Scale (SSS) of 3 (i.e., 4, 5, 6) or greater; Samn-Perelli fatigue Scale (SPS) of 5 (e.g., 6, 7) or greater; and the like, or combinations of any of the foregoing. For example, in the method of treating hypersomnia in a subject, the treatment decreases excessive time spent sleeping or EDS, decreases an ESS to 24 (e.g., 15, 12, 10, 5, 3, 2) or less; decreases a SSS of 7 (e.g., 6, 5, 4, 3, 2) or less; decreases a SPS of 7 (e.g., 6, 5, 4, 3, 2) or less; or the like, or combinations of any of the foregoing, in the subject.

In one embodiment, the method of treating a condition, such as a CNS disorder or condition, in a subject in need thereof, comprises administering a composition, where the composition comprises: at least one anxiolytic, at least one stimulant, and a pharmaceutically acceptable carrier, vehicle, diluent, excipient, or the like, where the at least one anxiolytic is benzodiazepine (e.g., alprazolam) and the at least one stimulant is amphetamine (e.g., levoamphetamine, dextroamphetamine, dextroamphetamine saccharate, amphetamine aspartate monohydrate, dextroamphetamine sulfate, amphetamine sulfate, lisdexamfetamine dimesylate, or a combination of any of the foregoing).

Another embodiment provides for a method of treating a condition in a subject, comprising administering a composition where the benzodiazepine is alprazolam and the stimulant is an amphetamine, in an amount effective to treat the condition in a subject, where treatment is by preventing, reducing, alleviating, decreasing, reducing, inhibiting, blocking, or eliminating symptoms of the condition in the subject. A further embodiment provides a method of treating a condition in a subject, comprising administering a composition containing alprazolam, which is a triazolo analog of 1,4-benzodiazepines (e.g., 8-chloro-1-methyl-6-phenyl-4H-s-triazolo[4,3-α][1,4]-benzodiazepine); an amphetamine containing dextroamphetamine sulfate (e.g., dextro isomer of d,l-amphetamine sulfate; d-alpha-methylphenethylamine neutral sulfate) or a combination of neutral sulfate salts of dextroamphetamine and of amphetamine, with the dextro isomer of amphetamine saccharate and d,l-amphetamine aspartate monohydrate; and a pharmaceutically acceptable carrier, vehicle, excipient, or diluent, in a therapeutically effective amount to prevent, reduce, alleviate, decrease, reduce, block, or eliminate symptoms of the condition in the subject, thereby treating the condition in the subject.

Yet another embodiment provides for a method of treating a condition in a subject, comprising administering at least one anxiolytic, such as benzodiazepine; and at least one stimulant, such as dextroamphetamine; or a composition comprising at least one anxiolytic, at least one stimulant, and a carrier, further comprising administering an antidepressant (e.g., selective serotonin reuptake inhibitor (SSRI), a selective norepinephrine reuptake inhibitor (SNRI), a tricyclic antidepressant (TCA), a monoamine oxidase inhibitor (MAOI), or a combination thereof). Non-limiting examples of antidepressants useful in the disclosed methods include: SSRIs: sertraline, paroxetine, fluoxetine, fluvoxamine, escitalopram, citalopram, vilazodone, and the like, or a combination of any of the foregoing; SNRIs: desvenlafaxine, duloxetine, venlafaxine, milnacipran, levomilnacipran; TCAs: amitriptyline, amoxapine, clomipramine, desipramine, doxepin, imipramine, nortriptyline, protriptyline, trimipramine; MAOIs: mirtazapine, bupropion, trazodone, vortioxetine, vilazodone; antidepressant fluoxetine; and the like, or a combination of any of the foregoing. It is understood that in some embodiments of the methods disclosed here, administration of the antidepressant, including but not limited to, SSRI, SNRI, or combinations of the SSRI and SNRI, may occur before, simultaneously, or after the administration of the disclosed combination of active ingredients and/or composition comprising: at least one anxiolytic (e.g., benzodiazepine, alprazolam, lorazepam, diazepam, chlordiazepoxide, clorazepate, oxazepam, clonazepam, temazepam, triazolam, flurazepam, estazolam, or the like, or combinations thereof, or a pharmaceutically acceptable salt, enantiomer, mixture of enantiomers, or racemic mixture of the anxiolytic, and/or a prodrug of any of the foregoing); at least one stimulant (e.g., amphetamine, levoamphetamine, dextroamphetamine, dextroamphetamine saccharate, amphetamine aspartate, dextroamphetamine sulfate, amphetamine sulfate, amphetamine sulfate, amphetamine aspartate monohydrate, lisdexamfetamine dimesylate, or the like, or a combination thereof, or a pharmaceutically acceptable salt, enantiomer, mixture of enantiomers, or racemic mixture of the stimulant, and/or a prodrug of any of the foregoing); and a pharmaceutically acceptable carrier (e.g., vehicle, excipient, diluent).

One embodiment provides a method of treating a condition in a subject, the method comprising: administering to a subject in need thereof, an effective amount of (a) benzodiazepine; and (b) amphetamine. Another embodiment may be directed to benzodiazepine selected from: benzodiazepine, or a pharmaceutically acceptable salt, enantiomer, mixture of enantiomers, or racemic mixture of the benzodiazepine, and/or a prodrug of any of the foregoing; and an amphetamine selected from: amphetamine, or a pharmaceutically acceptable salt, enantiomer, mixture of enantiomers, or racemic mixture of the amphetamine, and/or a prodrug of any of the foregoing. In a further embodiment, the benzodiazepine is alprazolam, and the amphetamine is dextroamphetamine or a combination of neutral sulfate salts of dextroamphetamine and of amphetamine, with the dextro isomer of amphetamine saccharate and d,l-amphetamine aspartate monohydrate. Yet another embodiment provides effective amounts of alprazolam of 0.25 mg-0.5 mg and effective amounts of dextroamphetamine of 10 mg-20 mg.

A further embodiment provides a method of treating a condition in a subject, the method comprising administering to the subject in need thereof, benzodiazepine (e.g., alprazolam, lorazepam, chlordiazepoxide, diazepam, etc., or a combination thereof, or a pharmaceutically acceptable salt, enantiomer, mixture of enantiomers, or racemic mixture of the benzodiazepine, and/or a prodrug of any of the foregoing) and amphetamine (e.g., levoamphetamine, dextroamphetamine, dextroamphetamine saccharate, amphetamine aspartate monohydrate, dextroamphetamine sulfate, amphetamine sulfate, etc., or a combination thereof, or a pharmaceutically acceptable salt, enantiomer, mixture of enantiomers, or racemic mixture of the amphetamine, and/or a prodrug of any of the foregoing). Another embodiment may be directed to a benzodiazepine that is alprazolam and an amphetamine that is dextroamphetamine (e.g., dextroamphetamine sulfate). A further embodiment may provide an amphetamine that is a combination of dextroamphetamine sulfate, dextroamphetamine saccharate, amphetamine sulfate (comprising both the levo- and dextro-forms), and amphetamine aspartate monohydrate (comprising both the levo- and dextro-forms).

Yet another embodiment may be directed to a method of treating a condition in a subject, where the method comprises administering active ingredients to the subject in need thereof, where the active ingredients include benzodiazepine and amphetamine, where the active ingredients may be administered simultaneously, or essentially simultaneously, or sequentially, where benzodiazepine is administered before amphetamine, or where amphetamine is administered before benzodiazepine.

Other embodiments provide dosage amounts of the active ingredients such that they have sufficient levels in the body or amounts required to have an effect on the condition, such as a reduction of the symptoms of the condition being treated in a subject. Medical practitioners understand that several factors may be considered when determining appropriate dosages, e.g., the overall health of the subject, age, weight, gender, diet, ethnicity, diagnosis, medical history, tolerance for anxiolytics and/or stimulants, etc. have all been found to influence both the pharmacokinetics and pharmacodynamics of drugs. The type of formulation should also be taken into consideration. For example, extended-release or sustained-release pharmaceutical composition may have a half-life period and clearance rate, depending on the specific formulation, that allows for several hours to days between administrations. In some embodiments, the dosage regimen of one or more of the active ingredients may include, but is not limited to, administration once an hour, every 2 hours, every 3 hours, every 4 hours, every 6 hours, every 8 hours, every 12 hours, once a day, twice a day, four times a day, daily, every other day, three times a week, four times a week, weekly, etc.

One embodiment may provide a method of treating a condition in a subject, a method comprising administering to a subject in need thereof, an effective amount of (a) benzodiazepine; and (b) amphetamine, where the condition is selected from a depression disorder, a post-traumatic stress disorder (PTSD), a hypoactive sexual desire disorder (HSDD), hypersomnia, attention deficit hyperactivity disorder (ADHD), attention deficit disorder (ADD), traumatic brain injury (TBI), being overweight, etc., where the composition is in an amount effective to treat the condition in the subject. Yet another embodiment relates to the methods disclosed here where the treatment reduces the symptoms of the condition in the subject. For example, the treatment of HSDD reduces lack of interest or desire of sexual activity; PTSD reduces anxiety; ADHD reduces inattention, hyperactivity, impulsivity; being overweight reduces weight or appetite, and the like.

Other embodiments may be directed to the compositions and methods described herein used in conjunction with other well-known therapeutic reagents or treatments which may be selected to supplement or for their particular utility against the condition being treated. The compositions described here and, in embodiments in which combination therapy is employed, other agents or therapeutic reagents are not required to be administered in the disclosed composition and may in fact be administered by other routes of administration. Depending on the physical and chemical characteristics of the active ingredients of the disclosure and the other agents or therapeutic reagents which may be combined, a single composition may not be feasible and these active ingredients and therapeutic reagents may need to be separately administered, or formulated separately. For example, the active ingredients may be in an oral capsule formulation, where one active is in a bead format and a different active is in a bead format, and there is no interaction until digested. A skilled practitioner would have knowledge in determining the mode of administration, type and frequency of administration, formulation, including whether or not certain active ingredients and therapeutic reagents may be in the same pharmaceutical composition. The skilled practitioner may follow established protocols for an initial administration and then, based on the observed effects in a subject, the dosage, modes of administration, and administration times or frequency may be modified accordingly.

In yet another embodiment, the method of treating a condition in a subject, comprising administering benzodiazepine and amphetamine, may further comprise administering a selective serotonin reuptake inhibitor (SSRI), a selective norepinephrine reuptake inhibitor (SNRI), or a combination thereof. Certain embodiments allow for the further administration of SSRI, SNRI, or a combination of SSRI and SNRI to be prior to or before, simultaneously with, or after the administration of the composition. A medical practitioner would understand whether a subject would need the additional administration of a SSRI, a SNRI, or a combination of SSRI and SNRI. Non-limiting examples of a SSRI include: sertraline, paroxetine, fluoxetine, fluvoxamine, escitalopram, citalopram, vilazodone, or a combination thereof. Non-limiting SNRIs include: desvenlafaxine, duloxetine, venlafaxine, milnacipran, levomilnacipran, or a combination thereof. The administration of SSRIs, SNRIs, or the combination of SSRIs and SNRIs alone may not be sufficient to treat an individual, there may be a benefit to a combination therapy of the disclosed method of administering at least one anxiolytic and at least one stimulant, and further administering a SSRI, a SNRI, or a combination of SSRI and SNRI.

Some embodiments may provide for methods of treating a subject suffering from a condition selected from HSDD, PTSD, ADHD or ADD, hypersomnia, depression, symptoms resulting from a TBI, and/or obesity or other overweight condition. Another embodiment provides for methods of treating male or female subjects suffering from HSDD, PTSD, and/or depression. A further embodiment provides for treating females suffering from HSDD, PTSD, and/or depression. In yet another embodiment, the methods of treating a condition in a subject may be selected from HSDD, PTSD, ADHD or ADD, hypersomnia, depression, symptoms resulting from a TBI, and/or obesity or other overweight condition, where the subject is an adolescent or young adult younger than 30 years old. The effective amount of an active ingredient used in the methods of treating a condition in children historically has been at a high dose, e.g., 30 mg at 3 times a day. However, the disclosed methods of treating conditions in a subject suffering from, for example, HSDD, PTSD, ADHD or ADD, hypersomnia, depression, symptoms resulting from a TBI, and/or obesity or other overweight condition, occurs by administering at least one anxiolytic (e.g., benzodiazepine, alprazolam, lorazepam, chlordiazepoxide, diazepam, etc., or a combination thereof, or a pharmaceutically acceptable salt, enantiomer, mixture of enantiomers, or racemic mixture of the benzodiazepine, and/or a prodrug of any of the foregoing); and at least one stimulant (e.g., amphetamine, levoamphetamine, dextroamphetamine, dextroamphetamine saccharate, amphetamine aspartate monohydrate, dextroamphetamine sulfate, amphetamine sulfate, etc., or a combination thereof, or a pharmaceutically acceptable salt, enantiomer, mixture of enantiomers, or racemic mixture of the amphetamine, and/or a prodrug of any of the foregoing) in an effective amount less than historical dosages, including but not limited to, an anxiolytic of 0.25 mg-0.5 mg and a stimulant of 10 mg-20 mg, where the administration is daily.

One embodiment of the disclosure provides a method of treating a female subject suffering from a hypoactive sexual desire disorder (HSDD), comprising: administering an effective amount of benzodiazepine and an effective amount of amphetamine. The female subject may be a premenopausal or postmenopausal woman. Some embodiments may be directed to treating premenopausal women having HSDD, where the women do not suffer from an anxiety disorder, such as ADHD, or a panic disorder, or a sleeping disorder, such as narcolepsy or hypersomnia, or an eating or weight management disorder, such as obesity or bulimia, or a memory loss disorder, such as dementia which may include but is not limited to, Alzheimer's disease dementia, Parkinson's disease dementia, Lewy Body dementia, frontotemporal dementia, Creutzfeldt-Jakob dementia, or the like, or combinations thereof. Other embodiments may be directed to methods of treating a female subject suffering from HSDD, and the female subject also suffers from one or more of: an anxiety disorder, a panic disorder, an attention disorder, PTSD, ADHD, depression or a depressive disorder, a sleeping disorder, narcolepsy, hypersomnia, a TBI, an emotional, mood, or personality change, an eating or weight management disorder, obesity, bulimia, a memory loss disorder, such as dementia, including but not limited to, Alzheimer's disease dementia, Parkinson's disease dementia, Lewy Body dementia, frontotemporal dementia, Creutzfeldt-Jakob dementia, and the like, or combinations thereof.

Another embodiment may be directed to a method of treating a condition in a subject, comprising administering to the subject in need thereof, an effective amount of benzodiazepine; and an effective amount of amphetamine. The condition may be selected from one or more of: a depression or a depressive disorder, an anxiety disorder, a panic disorder, a post-traumatic stress disorder (PTSD), an attention deficit hyperactivity disorder (ADHD), a sexual disorder, a hypoactive sexual desire disorder (HSDD), a sleeping disorder, hypersomnia, narcolepsy, traumatic brain injury (TBI), a weight management disorder, obesity, bulimia, a memory loss disorder, dementia, and the like, or combinations thereof, where the condition is treated as demonstrated by the reduction of symptoms of the condition in the subject. In some embodiments, the subject is a female, a premenopausal female, and/or a subject who suffers from HSDD. Other embodiments described herein may provide for methods of treating a subject suffering from PTSD and/or ADHD. In some subjects suffering from one or more of the conditions exemplified here, the subject is also prescribed and taking an antidepressant. Non-limiting examples of antidepressants include: selective serotonin reuptake inhibitors (SSRIs) (e.g., citalopram, escitalopram, fluoxetine, fluvoxamine, paroxetine, sertraline); serotonin and noradrenaline reuptake inhibitors (e.g., duloxetine, venlafaxine, desvenlafaxine); serotonin modulators (e.g., vortioxetine); noradrenaline reuptake inhibitors (e.g., reboxetine); tricyclic antidepressants (TCAs) (e.g., amitriptyline, nortriptyline, clomipramine, dothiepin, doxepin, imiprimine, trimipramine); reversible inhibitors of monoamine oxidase A (RIMAs) (e.g., moclobemide); tetracyclic antidepressants (e.g., mianserin); tetracyclic analogues of mianserin or noradrenergic and specific serotonergic antidepressants (NaSSAs) (e.g., mirtazapine); monoamine oxidase inhibitors (MAOIs) (e.g., phenelzine, tranylcypromine); melatonergic antidepressants (e.g., agomelatine); aminoketone antidepressants (e.g., bupropion, bupropion hydrochloride, WELLBUTRIN®, ZYBAN®).

Further embodiments of the disclosure may be directed to a method of diagnosing a subject with a disorder, such as a CNS disorder, and administering to the subject with the disorder, an effective amount of an anxiolytic, such as benzodiazepine, and an effective amount of a stimulant, such as amphetamine, thereby treating the subject diagnosed as having the disorder. For example, the method may comprise diagnosing a premenopausal female subject as having HSDD according to DSM-IV; administering an effective amount of benzodiazepine and an effective amount of amphetamine to the premenopausal female subject diagnosed as having HSDD, thereby treating HSDD in the premenopausal female subject diagnosed as having HSDD. Treatment may be recognized as an increase in sexual desire as measured by, for example, an increase in satisfying sexual events (SSEs).

Yet another embodiment may be directed to a method of diagnosing a condition in a subject, comprising diagnosing the subject as suffering from a CNS disorder according to DSM-IV or DSM-5 or wherein the subject is diagnosed as suffering from a CNS disorder according to DSM-IV or DSM-5, where the method further comprises administering to the subject in need thereof, an effective amount of benzodiazepine and an effective amount of amphetamine. The subject may be a female diagnosed as suffering from. In other embodiments, the subject may be diagnosed as suffering from one or more of: a sexual disorder or a sexual dysfunction disorder, HSDD according to DSM-IV (where the female may also be premenopausal), an anxiety disorder, a panic disorder, PTSD according to DSM-IV or DSM-5, ADHD according to DSM-IV, depression or a depressive disorder, a sleeping disorder, an eating disorder or a weight management disorder, or the like. A medical professional would have sufficient technical knowledge and/or experience to evaluate and diagnose the subject as having any of the CNS conditions described here.

In an embodiment of the method, the benzodiazepine is alprazolam, or a pharmaceutically acceptable salt, enantiomer, mixture of enantiomers, or racemic mixture of the benzodiazepine, and/or a prodrug of any of the foregoing; the amphetamine is dextroamphetamine, or a pharmaceutically acceptable salt, enantiomer, mixture of enantiomers, or racemic mixture of the amphetamine, and/or a prodrug of any of the foregoing. Another embodiment may be directed to dextroamphetamine, which is dextroamphetamine sulfate. A further embodiment provides amphetamine that is a combination of: amphetamine aspartate monohydrate, amphetamine sulfate, dextroamphetamine sulfate, and dextro amphetamine saccharate.

In yet another embodiment, the method of treating a female subject suffering from HSDD, comprising administering an effective amount of a benzodiazepine that is alprazolam and an effective amount of an amphetamine that is dextroamphetamine sulfate. A further embodiment provides an effective amount of a benzodiazepine that is alprazolam, while the effective amount of amphetamine is a combination of: amphetamine aspartate monohydrate, amphetamine sulfate, dextroamphetamine sulfate, and dextroamphetamine saccharate.

One embodiment of the method disclosed here provides for the administration of an effective amount of benzodiazepine and an effective amount of amphetamine are administered together, separately, simultaneously, or sequentially, where the effective amount of benzodiazepine and the effective amount of amphetamine are physically administered together or separately, or administered simultaneously or sequentially. Another embodiment may be directed to the method disclosed here, where the effective amount of benzodiazepine and the effective amount of amphetamine are administered simultaneously or sequentially, where the benzodiazepine is administered prior to the administration of the amphetamine, or the benzodiazepine is administered after the administration of the amphetamine, or the benzodiazepine and the amphetamine are administered essentially simultaneously. A further embodiment provides for the administration of an effective amount of the benzodiazepine and an effective amount of the amphetamine, where administration occurs together in a unit dosage form, and the unit dosage form comprises benzodiazepine in a dosage amount of 0.1 mg (e.g., 0.25 mg, 0.5 mg, 1 mg, 2 mg, 3 mg, 4 mg, 5 mg, 6 mg, 7 mg, 8 mg, 9 mg, 10 mg, etc.) or greater; 10 mg (e.g., 5 mg, 4.5 mg, 4 mg, 3.5 mg, 3 mg, 2.5 mg, 1.5 mg, 0.75 mg, 0.5 mg, etc.) or less; or 0.25 mg to 10 mg (e.g., 0.5 mg to 8 mg, 1 mg to 6 mg, 1.5 mg to 5 mg, 2 mg to 3 mg, etc.); and amphetamine in a dosage amount of 0.5 mg (e.g., 1 mg, 1.25 mg, 1.5 mg, 2 mg, 2.5 mg, 3 mg, 5 mg, 6 mg, 7 mg, 8 mg, 9 mg, 10 mg, 11 mg, 12 mg, 13 mg, 15 mg, 19 mg, 20 mg, 25 mg, 30 mg, 35 mg, 40 mg, 45 mg, 50 mg, 55 mg, etc.) or greater; 60 mg (e.g., 57.5 mg, 52.5 mg, 47.5 mg, 42.5 mg, 37.5 mg, 32.5 mg, 27.5 mg, 22.5 mg, 17.5 mg, 13.5 mg, 12.5 mg, 7.5 mg, 5 mg, 2.5 mg, 1 mg, etc.) or less; or 0.25 mg to 60 mg (e.g., 0.5 mg to 55 mg, 1 mg to 40 mg, 5 mg to 20 mg, 10 mg to 50 mg, 15 mg to 45 mg, 20 mg to 40 mg, 25 mg to 35 mg, etc.). In yet another embodiment, the effective amounts of active ingredients include: 0.25 mg-0.5 mg benzodiazepine and 10 mg-20 mg amphetamine.

One embodiment may provide for the method of treating a female subject suffering from HSDD, where the effective amount of benzodiazepine and the effective amount of amphetamine are administered together or separately in a unit dosage form comprising 0.25 mg-0.5 mg benzodiazepine and 10 mg-20 mg amphetamine. Furthermore, the unit dosage form may be a single composition or separate compositions. For example, a separate composition may include completely different formulations for each active ingredient, or a capsule containing two separate active ingredients formulated in particles or beads. In some embodiments, the unit dosage form is an oral composition selected from: a pill, a tablet, a caplet, a capsule, a lozenge, a syrup, or a suspension, where the oral composition is formulated as: an immediate-release dosage, a controlled-release, a modified-release dosage, a sustained-release dosage, a delayed-release dosage, an extended-release dosage, a long-acting release dosage, a prolonged-release dosage, or a timed-release dosage.

In some embodiments the method of treating a female subject suffering from HSDD, provides for administering an effective amount of alprazolam that is 0.25 mg-0.5 mg and an effective amount of dextroamphetamine sulfate that is 10 mg to 20 mg. A further embodiment of the method disclosed here provides for administering an effective amount of alprazolam is 0.25 mg-0.5 mg and an effective amount of amphetamine is 10 mg to 20 mg, wherein the amphetamine is a combination of: amphetamine aspartate monohydrate, amphetamine sulfate, dextroamphetamine sulfate, and dextroamphetamine saccharate. Where embodiments of the method of treating a female subject suffering from a HSDD comprises an effective amount of the amphetamine that is a combination of amphetamine aspartate monohydrate, amphetamine sulfate, dextroamphetamine sulfate, and dextroamphetamine saccharate, the effective amount of amphetamine is expressed as total amphetamine base equivalence. Other embodiments provide for the total amphetamine base equivalence of 3 mg to 20 mg.

Another embodiment may relate to the method of treating a female subject suffering from HSDD comprising administering an effective amount of benzodiazepine and an effective amount of amphetamine, where the effective amount is an effective amount for a single administration and/or daily administration and/or twice a day administration and/or multiple administrations per day or as needed, such as in the event of an adverse incident including but not limited to anxiety or panic attack. In yet another embodiment, the method of treating a female subject suffering from HSDD fails to respond to treatment with an antidepressant, such as but not limited to, a selective serotonin reuptake inhibitor (SSRI), a selective norepinephrine reuptake inhibitor (SNRI), or a combination of SSRI and SNRI. One embodiment provides for the method of treating a female subject suffering from HSDD comprising administering an effective amount of benzodiazepine and an effective amount of amphetamine, and further administering a selective serotonin reuptake inhibitor (SSRI), a selective norepinephrine reuptake inhibitor (SNRI), or a combination of SSRI and SNRI.

Some embodiments may be directed to the method of treating a female subject suffering from HSDD, where the female subject does not suffer from: attention deficient hyperactivity disorder (ADHD) according to Diagnostic and Statistical Manual of Mental Disorders (DSM)-5, an anxiety disorder according to DSM-IV or DSM-5, a diagnosis of anxiety according to DSM-IV or DSM-5, a diagnosis of a panic disorder according to DSM-IV, or narcolepsy according to DSM-5.

Other embodiments provide for the method of treating a female subject suffering from HSDD, where the female subject also suffers from one or more of: a post-traumatic stress disorder (PTSD) according to DSM-5, a depressive disorder according to DSM-5; depression according to DSM-IV or DSM-5; a traumatic brain injury (TBI) according to DSM-5; an anxiety disorder according to DSM-IV or DSM-5, a panic disorder according to DSM-IV, a mood disorder according to DSM-IV or DSM-5, or a personality change or disorder according to DSM-5.

Further embodiments relate to the method of treating a female subject suffering from HSDD, by administering an effective amount of benzodiazepine and an effective amount of amphetamine, where the method of treating reduces the symptoms of: HSDD, PTSD, a depressive disorder, a TBI, or any combinations of the foregoing.

In yet a further embodiment, the method of treating a female subject suffering from HSDD, comprises administering: an effective amount of at least one anxiolytic, an effective amount of at least one stimulant, where the at least one anxiolytic is selected from: XANAX® or XANAX XR®; and the at least one stimulant is selected from: DEXEDRINE®, DEXEDRINE® extended-release, ADDERALL®, or ADDERAL XR®. In some embodiments, the method comprises administering an effective amount of XANAX® (e.g., 0.25 mg-1 mg given 1 or more times a day to a recommended maximum of 4 mg/day) or an effective amount of XANAX® (e.g., 0.5 mg-10 mg once daily; 0.5 mg-6 mg once daily; 1 mg-3 mg once daily to a recommended maximum of 10 mg/day); and an effective amount of ADDERALL® (2.5 mg-5 mg to a recommended maximum of 40 mg/day given 1 or more times a day, where the doses are given at intervals of 4 to 6 hours, where the first dose is typically taken in the morning); an effective amount of ADDERALL XR® (e.g., 5 mg-30 mg or 10 mg-20 mg given once daily to a recommended maximum of 30 mg/day), where the dose is typically taken in the morning; an effective amount of DEXEDRINE® (e.g., 2.5 mg-5 mg given 1 or more times a day, where the doses are given at intervals of 4 to 6 hours, where the dose is typically taken in the morning); or an effective amount of DEXEDRINE® extended release (e.g., 5 mg or more once a day to a recommended maximum of 40 mg/day). Other embodiments may be directed to oral dosage forms containing, either separately or together, XANAX®, XANAX XR®, ADDERALL®, ADDERALL XR®, DEXEDRINE®, and/or DEXEDRINE® extended release, where the oral dosage form includes, but is not limited to, a pill, a tablet (e.g., an orally disintegrating tablet, orally dissolving tablet, sustained-release tablet, sugar-coated tablet, film-coated tablet, enteric-coated tablet), a caplet, a capsule (e.g., sustained-release capsule, extended-release spansule), a lozenge, a syrup or an elixir, or a suspension, or any other oral formulation found to be an effective way for administering the active ingredients or composition comprising the active ingredients of the disclosure. In some embodiments, the oral composition may be a formulation selected from: an immediate-release dosage, a controlled-release, a modified-release dosage, a sustained-release dosage, a delayed-release dosage, an extended-release dosage, a long-acting release dosage, a prolonged-release dosage, a timed-release dosage, etc.

One embodiment may provide a method of treating a condition in a subject, the method comprising: administering to a subject in need thereof, an effective amount of benzodiazepine; and an effective amount of amphetamine, where the condition is selected from: a depression disorder, a post-traumatic stress disorder (PTSD), a hypoactive sexual desire disorder (HSDD), hypersomnia, attention deficit hyperactivity disorder (ADHD), traumatic brain injury (TBI), being overweight, and the like. In some embodiments, the subject in need thereof is a female, where the female may be suffering from HSDD according to DSM-IV. In other embodiments, the method of treating a condition in a subject, where the condition is PTSD, ADHD, or a combination of both PTSD and ADHD, is provided, where the method comprises administering to the subject in need thereof, an effective amount of benzodiazepine that is alprazolam, or a pharmaceutically acceptable salt, enantiomer, mixture of enantiomers, or racemic mixture of the benzodiazepine, and/or a prodrug of any of the foregoing; an effective amount of amphetamine that is dextroamphetamine, or a pharmaceutically acceptable salt, enantiomer, mixture of enantiomers, or racemic mixture of the amphetamine, and/or a prodrug of any of the foregoing.

In other embodiments described here, the method of treating a condition in a subject, comprising: administering to the subject in need thereof, an effective amount of the benzodiazepine that is alprazolam; and an effective amount of the amphetamine that is dextroamphetamine, dextroamphetamine sulfate, or a combination of: amphetamine aspartate monohydrate, amphetamine sulfate, dextroamphetamine sulfate, and dextroamphetamine saccharate. Another embodiment provides for the method of treating a condition in a subject, comprising: administering to the subject in need thereof, an effective amount of the benzodiazepine and an effective amount of the amphetamine, where the benzodiazepine and the amphetamine are administered: together, simultaneously, or sequentially. When the benzodiazepine and the amphetamine are administered together or separately in a unit dosage form, the unit dosage form contains 0.25 mg-0.5 mg benzodiazepine and 10 mg-20 mg amphetamine. In some embodiments, the unit dosage form is a single composition comprising both the effective amount of benzodiazepine and the effective amount of amphetamine, or separate compositions, where the effective amount of benzodiazepine and the effective amount of amphetamine are in separate compositions. One embodiment may provide a unit dosage form that is an oral composition selected from a pill, a tablet, a caplet, a capsule, a lozenge, a syrup, or a suspension, and the oral composition is formulated as: an immediate-release dosage, a controlled-release, a modified-release dosage, a sustained-release dosage, a delayed-release dosage, an extended-release dosage, a long-acting release dosage, a prolonged-release dosage, or a timed-release dosage.

Further embodiments may be directed to the method of treating a condition in a subject, comprising: administering to the subject in need thereof, an effective amount of benzodiazepine that is 0.1 mg or greater, 10 mg or less, 0.1 mg to 10 mg, or 0.25 mg to 0.5 mg; and an effective amount of amphetamine is 1 mg or greater, 60 mg or less, 1 mg to 60 mg, or 10 mg to 20 mg; or the effective amount of alprazolam is 0.25 mg-0.5 mg and the effective amount of dextroamphetamine sulfate is 10 mg to 20 mg, or the effective amount of alprazolam is 0.25 mg-0.5 mg and the effective amount of amphetamine is 10 mg to 20 mg, where the amphetamine is a combination of: amphetamine aspartate monohydrate, amphetamine sulfate, dextroamphetamine sulfate, and dextroamphetamine saccharate. Another embodiment provides for the effective amount of amphetamine as expressed as total amphetamine base equivalence, where the total amphetamine base equivalence is 3 mg to 20 mg. Other embodiments may be directed to the method of treating a condition in a subject comprising administering to the subject in need thereof, an effective amount of benzodiazepine and an effective amount of amphetamine, where the effective amount is of benzodiazepine and the effective amount of amphetamine is for a single administration and/or daily administration and/or twice a day administration and/or multiple administrations per day or as needed (for example, in the event of an anxiety or panic event). Embodiments of the disclosure where the method of treating a condition in a subject are provided, and the subject fails to respond to treatment with an antidepressant, including but not limited to, a selective serotonin reuptake inhibitor (SSRI), a selective norepinephrine reuptake inhibitor (SNRI), or a combination of SSRI and SNRI. Other embodiments of the method disclosed here, further comprise administering an antidepressant, such as but not limited to a selective serotonin reuptake inhibitor (SSRI), a selective norepinephrine reuptake inhibitor (SNRI), or a combination of SSRI and SNRI. In yet a further embodiment, the method of treating a condition in a subject results in the reduction of symptoms of the treated condition in the subject.

In yet a further embodiment, the method of treating a subject suffering from a condition condition, such as a CNS disorder, comprises administering: an effective amount of at least one anxiolytic, an effective amount of at least one stimulant, where the at least one anxiolytic is selected from:

XANAX® or XANAX XR®; and the at least one stimulant is selected from: DEXEDRINE®, DEXEDRINE® extended-release, ADDERALL®, or ADDERAL XR®. In some embodiments, the method comprises administering an effective amount of XANAX® (e.g., 0.25 mg-1 mg given 1 or more times a day to a recommended maximum of 4 mg/day) or an effective amount of XANAX® (e.g., 0.5 mg-10 mg once daily; 0.5 mg-6 mg once daily; 1 mg-3 mg once daily to a recommended maximum of 10 mg/day); and an effective amount of ADDERALL® (2.5 mg-5 mg to a recommended maximum of 40 mg/day given 1 or more times a day, where the doses are given at intervals of 4 to 6 hours, where the first dose is typically taken in the morning); an effective amount of ADDERALL XR® (e.g., 5 mg-30 mg or 10 mg-20 mg given once daily to a recommended maximum of 30 mg/day), where the dose is typically taken in the morning; an effective amount of DEXEDRINE® (e.g., 2.5 mg-5 mg given 1 or more times a day, where the doses are given at intervals of 4 to 6 hours, where the dose is typically taken in the morning); or an effective amount of DEXEDRINE® extended release (e.g., 5 mg or more once a day to a recommended maximum of 40 mg/day). Other embodiments may be directed to oral dosage forms containing, either separately or together, XANAX®, XANAX XR®, ADDERALL®, ADDERALL XR®, DEXEDRINE®, and/or DEXEDRINE® extended release, where the oral dosage form includes, but is not limited to, a pill, a tablet (e.g., an orally disintegrating tablet, orally dissolving tablet, sustained-release tablet, sugar-coated tablet, film-coated tablet, enteric-coated tablet), a caplet, a capsule (e.g., sustained-release capsule, extended-release spansule), a lozenge, a syrup or an elixir, or a suspension, or any other oral formulation found to be an effective way for administering the active ingredients or composition comprising the active ingredients of the disclosure. In some embodiments, the oral composition may be a formulation selected from: an immediate-release dosage, a controlled-release, a modified-release dosage, a sustained-release dosage, a delayed-release dosage, an extended-release dosage, a long-acting release dosage, a prolonged-release dosage, a timed-release dosage, etc.

Other embodiments provide for a method comprising:

diagnosing a female subject as having HSDD according to DSM-IV;

administering an effective amount of benzodiazepine and an effective amount of amphetamine to the subject diagnosed as having HSDD, thereby treating the subject diagnosed as having HSDD. Further embodiments of the method are provided where the effective amount of benzodiazepine is alprazolam, or a pharmaceutically acceptable salt, enantiomer, mixture of enantiomers, or racemic mixture of the benzodiazepine, and/or a prodrug of any of the foregoing; the effective amount of amphetamine is dextroamphetamine, or a pharmaceutically acceptable salt, enantiomer, mixture of enantiomers, or racemic mixture of the amphetamine, and/or a prodrug of any of the foregoing, or dextroamphetamine sulfate, or a combination of: amphetamine aspartate monohydrate, amphetamine sulfate, dextroamphetamine sulfate, and dextroamphetamine saccharate. Another embodiment of the method may provide for an effective amount of the benzodiazepine that is alprazolam and the effective amount of amphetamine that is dextroamphetamine sulfate or a combination of: amphetamine aspartate monohydrate, amphetamine sulfate, dextroamphetamine sulfate, and dextroamphetamine saccharate. Other embodiments provide for the method of diagnosing a female subject as having HSDD according to DSM-IV; administering an effective amount of benzodiazepine and an effective amount of amphetamine, where administration occurs together, simultaneously, or sequentially. In embodiments where the effective amount of benzodiazepine and the effective amount of amphetamine are administered together or separately in a unit dosage form, the unit dosage form comprises 0.25 mg-0.5 mg benzodiazepine and 10 mg-20 mg amphetamine, where the unit dosage form is: a single composition containing both benzodiazepine and amphetamine, separate compositions where each of the separate compositions contains one of benzodiazepine or one of amphetamine. Another embodiment may be directed to the unit dosage form of the disclosed method, where the unit dosage form is an oral composition selected from: a pill, a tablet, a caplet, a capsule, a lozenge, a syrup, or a suspension, and the oral composition may be formulated as: an immediate-release dosage, a controlled-release, a modified-release dosage, a sustained-release dosage, a delayed-release dosage, an extended-release dosage, a long-acting release dosage, a prolonged-release dosage, or a timed-release dosage.

Another embodiment of the method of diagnosing a female subject as having HSDD according to DSM-IV; and administering an effective amount of benzodiazepine and an effective amount of amphetamine to the subject diagnosed as having HSDD, the effective amount of benzodiazepine is 0.1 mg or greater, 10 mg or less, 0.1 mg to 10 mg, 0.25 mg to 0.5 mg; the effective amount of amphetamine is 1 mg or greater, 60 mg or less, 1 mg to 60 mg, 10 mg to 20 mg. A futher embodiment of the method of diagnosing a female subject as having HSDD according to DSM-IV; and administering an effective amount of alprazolam that is 0.25 mg-0.5 mg and an effective amount of: dextroamphetamine sulfate that is 10 mg to 20 mg or amphetamine that is 10 mg to 20 mg, where the amphetamine is a combination of: amphetamine aspartate monohydrate, amphetamine sulfate, dextroamphetamine sulfate, and dextroamphetamine saccharate, where the effective amount of amphetamine is expressed as total amphetamine base equivalence, and the total amphetamine base equivalence is 3 mg to 20 mg. Other embodiments of the method of diagnosing a female subject as having HSDD according to DSM-IV; and administering an effective amount of alprazolam and an effective amount of dextroamphetamine, where the effective amount alprazolam and the effective amount of dextroamphetamine is an effective amount for a single administration and/or daily administration and/or twice a day administration and/or multiple administrations per day or as needed (for example, in the event of an anxiety or panic event).

In yet a further embodiment, the method of diagnosing a female subject as suffering from HSDD according to DSM-IV, comprises administering to the female subject diagnosed as having HSDD: an effective amount of at least one anxiolytic, an effective amount of at least one stimulant, where the at least one anxiolytic is selected from: XANAX® or XANAX XR®; and the at least one stimulant is selected from: DEXEDRINE®, DEXEDRINE® extended-release, ADDERALL®, or ADDERAL XR®. In some embodiments, the method comprises administering an effective amount of XANAX® (e.g., 0.25 mg-1 mg given 1 or more times a day to a recommended maximum of 4 mg/day) or an effective amount of XANAX® (e.g., 0.5 mg-10 mg once daily; 0.5 mg-6 mg once daily; 1 mg-3 mg once daily to a recommended maximum of 10 mg/day); and an effective amount of ADDERALL® (2.5 mg-5 mg to a recommended maximum of 40 mg/day given 1 or more times a day, where the doses are given at intervals of 4 to 6 hours, where the first dose is typically taken in the morning); an effective amount of ADDERALL XR® (e.g., 5 mg-30 mg or 10 mg-20 mg given once daily to a recommended maximum of 30 mg/day), where the dose is typically taken in the morning; an effective amount of DEXEDRINE® (e.g., 2.5 mg-5 mg given 1 or more times a day, where the doses are given at intervals of 4 to 6 hours, where the dose is typically taken in the morning); or an effective amount of DEXEDRINE® extended release (e.g., 5 mg or more once a day to a recommended maximum of 40 mg/day), thereby treating the subject diagnosed as having HSDD, where the treatment is the reduction of at least one symptom of HSDD. Other embodiments may be directed to oral dosage forms containing, either separately or together, XANAX®, XANAX XR®, ADDERALL®, ADDERALL XR®, DEXEDRINE®, and/or DEXEDRINE® extended release, where the oral dosage form includes, but is not limited to, a pill, a tablet (e.g., an orally disintegrating tablet, orally dissolving tablet, sustained-release tablet, sugar-coated tablet, film-coated tablet, enteric-coated tablet), a caplet, a capsule (e.g., sustained-release capsule, extended-release spansule), a lozenge, a syrup or an elixir, or a suspension, or any other oral formulation found to be an effective way for administering the active ingredients or composition comprising the active ingredients of the disclosure. In some embodiments, the oral composition may be a formulation selected from: an immediate-release dosage, a controlled-release, a modified-release dosage, a sustained-release dosage, a delayed-release dosage, an extended-release dosage, a long-acting release dosage, a prolonged-release dosage, a timed-release dosage, etc.

A further embodiment provides a method of diagnosing a condition in a subject, where the subject is diagnosed as suffering from a central nervous system (CNS) disorder according to DSM-IV; and administering to the subject in need thereof, an effective amount of benzodiazepine and an effective amount of amphetamine, thereby treating the condition diagnosed in the subject. In one embodiment, the method of diagnosing a condition may be directed to the subject in need thereof, where the subject is: a female diagnosed as suffering from HSDD according to DSM-IV; diagnosed as suffering from PTSD according to DSM-IV; diagnosed as suffering from ADHD according to DSM-IV, where benzodiazepine comprises alprazolam, or a pharmaceutically acceptable salt, enantiomer, mixture of enantiomers, or racemic mixture of the benzodiazepine, and/or a prodrug of any of the foregoing; where the amphetamine comprises dextroamphetamine, or a pharmaceutically acceptable salt, enantiomer, mixture of enantiomers, or racemic mixture of the amphetamine, and/or a prodrug of any of the foregoing, and where the amphetamine is dextroamphetamine, dextroamphetamine sulfate, or a combination of: amphetamine aspartate monohydrate, amphetamine sulfate, dextroamphetamine sulfate, and dextroamphetamine saccharate. Another embodiment of the method of diagnosing may be directed to the administration of an effective amount of benzodiazepine that is alprazolam and the amphetamine is dextroamphetamine sulfate or a combination of: amphetamine aspartate monohydrate, amphetamine sulfate, dextroamphetamine sulfate, and dextroamphetamine saccharate, or the benzodiazepine and the amphetamine are administered together, separately, simultaneously, or sequentially. A further embodiment of the method of a condition in a subject, where the subject is diagnosed as suffering from a central nervous system (CNS) disorder according to DSM-IV; and administering to the subject in need thereof, an effective amount of benzodiazepine and an effective amount of amphetamine, where the benzodiaepine and the amphetamine are administered together or separately in a unit dosage form comprising 0.25 mg-0.5 mg benzodiazepine and 10 mg-20 mg amphetamine.

In embodiments of the method of diagnosing, where the effective amount of benzodiazepine and the effective amount of amphetamine are administered together or separately in a unit dosage form, the unit dosage form is: a single composition containing both benzodiazepine and amphetamine, or separate compositions where each of the separate compositions contains one of benzodiazepine or one of amphetamine. Another embodiment may be directed to the unit dosage form of the disclosed method, where the unit dosage form is an oral composition selected from: a pill, a tablet, a caplet, a capsule, a lozenge, a syrup, or a suspension, and the oral composition may be formulated as: an immediate-release dosage, a controlled-release, a modified-release dosage, a sustained-release dosage, a delayed-release dosage, an extended-release dosage, a long-acting release dosage, a prolonged-release dosage, or a timed-release dosage.

Other embodiments provide the method of diagnosing a condition in a subject, where the subject is diagnosed as suffering from a central nervous system (CNS) disorder according to DSM-IV; and administering to the subject in need thereof, an effective amount of benzodiazepine that is 0.1 mg or greater, 10 mg or less, 0.1 mg to 10 mg, or 0.25 mg to 0.5 mg; an effective amount of amphetamine that is 1 mg or greater, 60 mg or less, 1 mg to 60 mg, or 10 mg to 20 mg. The method may, in another embodiment, comprise administering to the subject in need thereof, an effective amount of alprazolam that is 0.25 mg-0.5 mg; and an effective amount of dextroamphetamine sulfate that is 10 mg to 20 mg or an effective amount of alprazolam that is 0.25 mg-0.5 mg, where the effective amount of amphetamine is 10 mg to 20 mg, and the amphetamine is a combination of: amphetamine aspartate monohydrate, amphetamine sulfate, dextroamphetamine sulfate, and dextroamphetamine saccharate. Certain embodiments comprising an effective amount of amphetamine, where the amphetamine is a combination of: amphetamine aspartate monohydrate, amphetamine sulfate, dextro amphetamine sulfate, and dextroamphetamine saccharate, the effective amount of amphetamine is expressed as total amphetamine base equivalence, and the total amphetamine base equivalence is 3 mg to 20 mg.

In yet a further embodiment, the method of diagnosing a condition in a subject, where the subject is diagnosed as suffering from a CNS disorder according to DSM-IV, comprises administering to the subject diagnosed as having a CNS disorder: an effective amount of at least one anxiolytic, an effective amount of at least one stimulant, where the at least one anxiolytic is selected from: XANAX® or XANAX XR®; and the at least one stimulant is selected from: DEXEDRINE®, DEXEDRINE® extended-release, ADDERALL®, or ADDERAL XR®. In some embodiments, the method comprises administering an effective amount of XANAX® (e.g., 0.25 mg-1 mg given 1 or more times a day to a recommended maximum of 4 mg/day) or an effective amount of XANAX® (e.g., 0.5 mg-10 mg once daily; 0.5 mg-6 mg once daily; 1 mg-3 mg once daily to a recommended maximum of 10 mg/day); and an effective amount of ADDERALL® (2.5 mg-5 mg to a recommended maximum of 40 mg/day given 1 or more times a day, where the doses are given at intervals of 4 to 6 hours, where the first dose is typically taken in the morning); an effective amount of ADDERALL XR® (e.g., 5 mg-30 mg or 10 mg-20 mg given once daily to a recommended maximum of 30 mg/day), where the dose is typically taken in the morning; an effective amount of DEXEDRINE® (e.g., 2.5 mg-5 mg given 1 or more times a day, where the doses are given at intervals of 4 to 6 hours, where the dose is typically taken in the morning); or an effective amount of DEXEDRINE® extended release (e.g., 5 mg or more once a day to a recommended maximum of 40 mg/day), thereby treating the subject diagnosed as having HSDD, where the treatment is the reduction of at least one symptom of HSDD. Other embodiments may be directed to oral dosage forms containing, either separately or together, XANAX®, XANAX XR®, ADDERALL®, ADDERALL XR®, DEXEDRINE®, and/or DEXEDRINE® extended release, where the oral dosage form includes, but is not limited to, a pill, a tablet (e.g., an orally disintegrating tablet, orally dissolving tablet, sustained-release tablet, sugar-coated tablet, film-coated tablet, enteric-coated tablet), a caplet, a capsule (e.g., sustained-release capsule, extended-release spansule), a lozenge, a syrup or an elixir, or a suspension, or any other oral formulation found to be an effective way for administering the active ingredients or composition comprising the active ingredients of the disclosure. In some embodiments, the oral composition may be a formulation selected from: an immediate-release dosage, a controlled-release, a modified-release dosage, a sustained-release dosage, a delayed-release dosage, an extended-release dosage, a long-acting release dosage, a prolonged-release dosage, a timed-release dosage, etc.

Another embodiment may relate to the method of diagnosing a condition in a subject, where the subject is diagnosed as suffering from a central nervous system (CNS) disorder according to DSM-IV; and administering to the subject in need thereof, an effective amount of benzodiazepine and an effective amount of amphetamine, where the effective amount is an effective amount for a single administration and/or daily administration and/or twice a day administration and/or multiple administrations per day or as needed (for example, in the event of an anxiety or panic event). In yet another embodiment, the method of diagnosing a condition in a subject, where the subject is diagnosed as suffering from a central nervous system (CNS) disorder according to DSM-IV, the subject fails to respond to treatment with a selective serotonin reuptake inhibitor (SSRI), a selective norepinephrine reuptake inhibitor (SNRI), or a combination of SSRI and SNRI. One embodiment provides for the method of diagnosing a condition in a subject, where the subject is diagnosed as suffering from a central nervous system (CNS) disorder according to DSM-IV, the subject, and administering an effective amount of benzodiazepine and an effective amount of amphetamine, and further administering a selective serotonin reuptake inhibitor (SSRI), a selective norepinephrine reuptake inhibitor (SNRI), or a combination of SSRI and SNRI.

Some embodiments may be directed to the method of diagnosing a condition in a subject, where the subject is diagnosed as suffering from a central nervous system (CNS) disorder according to DSM-IV, where the subject does not suffer from: attention deficient hyperactivity disorder (ADHD) according to Diagnostic and Statistical Manual of Mental Disorders (DSM)-5, an anxiety disorder according to DSM-IV or DSM-5, a diagnosis of anxiety according to DSM-IV or DSM-5, a diagnosis of a panic disorder according to DSM-IV, or narcolepsy according to DSM-5.

Other embodiments provide for the method of diagnosing a condition in a subject, where the subject is diagnosed as suffering from a central nervous system (CNS) disorder according to DSM-IV, where the subject is a subject suffering from HSDD and/or from: a post-traumatic stress disorder (PTSD) according to DSM-5, a depressive disorder according to DSM-5; an anxiety disorder according to DSM-IV or DSM-5, a sleeping disorder, a weight management disorder, and/or a traumatic brain injury (TBI) according to DSM-5.

Further embodiments relate to the method of diagnosing a condition in a subject, where the subject is diagnosed as suffering from a disorder, including but not limited to a central nervous system (CNS) disorder according to DSM-IV, and administering an effective amount of benzodiazepine and an effective amount of amphetamine, where the method of administration reduces the symptoms of: HSDD, PTSD, a depressive disorder, an anxiety disorder, a TBI, a sleeping disorder, a weight management disorder, and the like, or any combinations of the foregoing.

EXAMPLES

The following examples illustrate specific aspects of the instant description. The examples should not be construed as limiting, as the example merely provides specific understanding and practice of the embodiments and its various aspects.

Example 1: Case Study 1

Patient was a 38-year-old female diagnosed with PTSD, depression, and anxiety. She had a history of adult sexual abuse which affected her mood and caused her severe trauma disorder, severe depression, and anxiety. She also claimed to be "numb," whereby she felt no emotions. She suffered from these problems for several years. She also attempted suicide approximately one year ago. WELLBUTRIN® (bupropion hydrochloride; a norepinephrine-dopamine reuptake inhibitor (NDRI)), ABILIFY® (aripiprazole; second generation antipsychotic (SGA) or atypical antipsychotic), and KLONAPIN® (clonazepam; benzodiazepine) were prescribed by patient's previous psychiatrist and treatment continued. After some time, she was taken off of KLONAPIN® and ABILIFY® completely, and the dosage of WELLBUTRIN® was reduced to 150 mg. She was emotionally numb and developed HSDD. She was then prescribed ADDERALL®, 10 mg, twice a day, and XANAX®, 0.5 mg, twice a day, which resulted in a positive outcome regarding her HSDD as defined as an increase in satisfying sexual events (SSEs).

Example 2: Case Study 2

Patient was a 40-year-old female, diagnosed with major depression, panic disorder, and specific phobias. She was treated for more than three years. Due to her poor relationship with her husband, in which she no longer felt sexual attraction to him, she developed HSDD. She was prescribed ADDERALL®, 10 mg, twice a day, and XANAX®, 0.5 mg, as needed upon an anxiety or panic event. This resulted in a positive outcome regarding her HSDD as defined as an increase in SSEs.

Example 3: Case Study 3

Patient was a 41-year-old female, diagnosed with major depression and anxiety. As a result of childhood trauma, she developed a poor relationship with her husband. After her divorce, life was difficult and subsequently she was diagnosed with HSDD. She was prescribed ADDERALL®, 10 mg, twice a day, and XANAX®, 0.5 mg as needed upon an anxiety or panic event, which resulted in a positive outcome regarding her HSDD as defined as an increase in SSEs.

Example 4: Case Study 4

Patient was a 27-year-old female with a history of childhood and adulthood trauma. She experienced severe mood swings and suffered from alcoholism which resulted in her divorce. She had been hospitalized multiple times and attempted suicide several times. She developed HSDD. For treatment, she was prescribed ADDERALL®, 10 mg, twice a day, and XANAX®, 0.5 mg as needed upon an anxiety or panic event, which resulted in a positive outcome for HSDD as defined as an increase in SSEs.

SPECIFIC EMBODIMENTS

Non-limiting specific embodiments are described here, each of which is considered to be within the present disclosure.

As various changes can be made in the above-described subject matter without departing from the scope and spirit of the present disclosure, it is intended that all subject matter contained in the above description, or defined in the appended claims, be interpreted as descriptive and illustrative of the present disclosure. Many modifications and variations of the present disclosure are possible in light of the above teachings. Accordingly, the present description is intended to embrace all such alternatives, modifications and variances which fall within the scope of the appended claims.

All documents cited or referenced herein and all documents cited or referenced in the herein cited documents, together with any manufacturer's instructions, descriptions, product specifications, and product sheets for any products mentioned herein or in any document incorporated by reference herein, are hereby incorporated by reference, and may be employed in the practice of the disclosure.

What is claimed is:

1. A method of treating a female subject suffering from hypoactive sexual desire disorder (HSSD) comprising administering to the female subject, an effective amount of alprazolam, or a pharmaceutically acceptable salt, enantiomer, mixture of enantiomers, or racemic mixture of the alprazolam and an effective amount of dextroamphetamine, or a pharmaceutically acceptable salt, enantiomer, mixture of enantiomers, or racemic mixture of the dextroamphetamine.

2. The method of claim 1, wherein the dextroamphetamine comprises dextroamphetamine sulfate.

3. The method of claim 1, wherein the dextroamphetamine comprises a combination of: amphetamine aspartate monohydrate, amphetamine sulfate, dextroamphetamine sulfate, and dextroamphetamine saccharate.

4. The method of claim 1, wherein the alprazolam and the dextroamphetamine are administered together.

5. The method of claim 1, wherein the alprazolam and the dextroamphetamine are administered separately.

6. The method of claim 1, wherein the alprazolam and the dextroamphetamine are administered simultaneously.

7. The method of claim 1, wherein the alprazolam and the dextroamphetamine are administered sequentially.

8. The method of claim 1, wherein the alprazolam and the dextroamphetamine are administered in a unit dosage form comprising 0.25 mg-1 mg alprazolam and 5 mg-20 mg dextroamphetamine.

9. The method of claim 8, wherein the unit dosage form is a single composition.

10. The method of claim 8, wherein the unit dosage form comprises separate compositions.

11. The method of claim 8, wherein the unit dosage form is an oral composition.

12. The method of claim 11, wherein the oral composition is selected from: a pill, a tablet, a caplet, a capsule, a lozenge, a syrup, or a suspension.

13. The method of claim 11, wherein the oral composition is formulated as: an immediate-release dosage, a controlled-release, a modified-release dosage, a sustained-release dosage, a delayed-release dosage, an extended-release dosage, a long-acting release dosage, a prolonged-release dosage, or a timed-release dosage.

14. The method of claim 1, wherein the effective amount of alprazolam is 0.25 mg-1 mg.

15. The method of claim 1, wherein the effective amount of dextroamphetamine is 5 mg-20 mg.

16. The method of claim 1, further comprising administering an antidepressant.

17. The method of claim 16, wherein the antidepressant is selected from:

a selective serotonin reuptake inhibitor (SSRI), a selective norepinephrine reuptake inhibitor (SNRI), a tricyclic antidepressant (TCA), a monoamine oxidase inhibitor (MAOI), a reversible inhibitors of monoamine oxidase A (RIMA), a tetracyclic antidepressant, a tetracyclic analogue of mianserin or noradrenergic and specific serotonergic antidepressants (NaSSAs), a melatonergic antidepressant, an aminoketone antidepressant, or any combinations thereof; or agomelatine, amitriptyline, amoxapine, bupropion, bupropion hydrochloride, citalopram, clomipramine, desipramine, desvenlafaxine, doxepin, duloxetine, escitalopram, fluvoxamine, fluoxetine, imipramine, levomilnacipran, mianserin, milnacipran, mirtazapine, moclobemide, nortriptyline, paroxetine, phenelzine, protriptyline, sertraline, tranylcypromine, trazodone, trimipramine, venlafaxine, vilazodone, vortioxetine, or any combinations thereof.

18. The method of claim 1, wherein the method reduces the symptoms of HSDD.

* * * * *